US008036672B2

(12) United States Patent
Laroia et al.

(10) Patent No.: US 8,036,672 B2
(45) Date of Patent: Oct. 11, 2011

(54) METHODS AND APPARATUS RELATED TO RESOURCE ALLOCATION IN A WIRELESS COMMUNICATIONS SYSTEM

(75) Inventors: Rajiv Laroia, Far Hills, NJ (US); Vladimir Parizhsky, New York, NY (US); Junyi Li, Bedminster, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1438 days.

(21) Appl. No.: 11/486,810

(22) Filed: Jul. 14, 2006

(65) Prior Publication Data

US 2008/0014951 A1    Jan. 17, 2008

(51) Int. Cl.
*H04W 72/00* (2009.01)
(52) U.S. Cl. ............... 455/450; 455/451; 455/452.1; 455/452.2; 455/455; 455/453; 370/328; 370/329
(58) Field of Classification Search ............. 455/450, 455/451, 452.1, 452.2, 455, 509, 453; 370/328, 370/329
See application file for complete search history.

(56) References Cited

U.S. PATENT DOCUMENTS

2005/0120097 A1   6/2005 Walton, Jr. et al.
2009/0305711 A1*  12/2009 Rinne et al. ............... 455/450

FOREIGN PATENT DOCUMENTS

| CN | 1115164 | 1/1996 |
|---|---|---|
| EP | 0687078 | 12/1995 |
| JP | 7336774 A | 12/1995 |
| JP | 9055693 | 2/1997 |
| JP | 201160983 A | 6/2001 |
| JP | 2007513571 T | 5/2007 |
| WO | WO2005055527 | 6/2005 |

OTHER PUBLICATIONS

International Search Report—PCT/US2007/073288, International Search Authority—European Patent Office—Jul. 3, 2008.
Written Opinion—PCT/US2007/073288, International Search Autrthority—European Patent Office—Jul. 3, 2008.

* cited by examiner

*Primary Examiner* — Kamran Afshar
*Assistant Examiner* — Sayed T Zewari
(74) *Attorney, Agent, or Firm* — Donald C. Kordich

(57) ABSTRACT

Methods and apparatus of efficient communication of resource allocation are described. A base station transmits a resource assignment message, e.g., a state transition message, to a wireless terminal including a first part, e.g., a base station assigned wireless terminal On state identifier, identifying a resource being assigned and a second part, e.g., an ON state mask, identifying a portion of the resource allocated to the wireless terminal. The same resource allocation message information also communicates one of a plurality of different modes of commanded On state operation. The resource allocation message structure supports flexible allocation of available resources facilitating a resource to be partitioned differently at different times accommodating current needs. A predetermined recurring channel structure and association of segments with particular mask bits, facilitates allocated control segments to be used unambiguously without the need to include an overhead wireless terminal identifier field with the control report bits being communicated.

84 Claims, 23 Drawing Sheets

METHODS AND APPARATUS RELATED TO RESOURCE ALLOCATION IN A WIRELESS COMMUNICATIONS SYSTEM

FIELD OF THE INVENTION

This invention relates to multi-user communications systems and, more particularly, to methods and apparatus related to resource allocation in a wireless communication system.

BACKGROUND

As the popularity of wireless communications systems increases and the variety of types of data communications services offered increases, there is an ever increasing demand for the limited available air link resources, e.g., frequency spectrum, allocated to a given base station for its cell. In addition, the number of users and user demand for resources can vary as a function of time and events which can cause anticipated and unanticipated peaks in demand. High numbers of concurrent active users in a cell create challenges to satisfy the users' needs to communicate uplink and/or downlink user data in a timely manner while not expending a large portion of those air link resources for control signaling purposes. Resources that are utilized for control signaling purposes such as assignments reduce the amount of resources available to communicate user data. Complicating the efficient use of resources is the fact that, there are typically a variety of different types of users and/or applications which may have different resource demands and requirements.

One method of allocating control resources is for a base station to subdivide a particular control resource into uniform portions, for a wireless terminal to send a resource request when it needs to communicate an individual message or report and for the base station to individually assign one of the resource portions to that wireless terminal if available. Then the wireless terminal sends the control message or report over the assigned resource portion. This approach involves significant overhead signaling. Another alternative is to implement shared control channel resources. A wireless terminal sends control messages including wireless terminal identification information using the shared resources as needed; however, collisions may occur with other wireless terminals attempting to use the same resources concurrently resulting in unsuccessful communication and the need for retransmission. In some such approaches acknowledgement signaling is also used to improve communications, but this also adds overhead. Another approach involves setting aside a fixed amount of control channel resources for each wireless terminal to be operated in an On state concurrently; however this approach may result in inefficiencies as different wireless terminal types may have different resource needs and/or the same wireless terminal may have different resource needs at different times, e.g., due to different channel condition, applications being used, power availability, etc.

While the known resource allocation methods may be adequate for some applications, it would be beneficial if new and improved methods and apparatus were available for resource allocation. It would be desirable if at least some new methods and apparatus could efficiently support a high number of users, provide flexibility in terms of accommodating different types of users/applications/current needs, and/or limit control signaling overhead as compared to other techniques. Methods and apparatus that efficiently communicate resource allocation and/or support a plurality of different level of On state operation would be beneficial.

SUMMARY

Various embodiments are directed to methods and apparatus for flexible allocation of resources, e.g., uplink and/or downlink control channel air link resources, and/or efficient communication of the allocation of such resources. Some, but not necessarily all embodiments, support a plurality of different levels of wireless terminal On state operation in which different amounts control channel resources are allocated, yet each of the different levels of On state operation supports the opportunity for the assignment of at least some traffic channel segments to the wireless terminal.

An exemplary method of operating a base station in accordance with various embodiments includes: transmitting a multi-part resource assignment message, said message including a first part identifying a resource being assigned and a second part indicating a portion of said resource allocated to said communications device; and performing at least one of receiving a signal communicated using said allocated portion of said resource from said communications device and transmitting a signal communicated using said allocated portion of said resource to said communications device. In one exemplary embodiment, the multi-part resource assignment message is a state transition message including a base station assigned wireless terminal On state identifier and a corresponding On state mask. An exemplary base station in accordance with various embodiments includes a multi-part resource assignment message generation module for generating a multi-part resource assignment message, said multi-part resource assignment message including a first part identifying a resource being assigned and a second part indicating a portion of said resource being allocated to a communication device to which said multi-part resource assignment message is directed; and a transmitter for transmitting said generated multi-part resource assignment message.

An exemplary method of operating a wireless terminal in accordance with various embodiments includes: receiving a multi-part resource assignment message, said message including a first part identifying a resource being assigned and a second part indicating a portion of said resource allocated to said wireless terminal; and performing at least one of transmitting a signal using said allocated portion of said resource and receiving a signal communicated using said allocated portion of said resource. An exemplary wireless terminal in accordance with various embodiment includes: a receiver for receiving a multi-part resource assignment message, said message including a first part identifying a resource being assigned and a second part indicating a portion of said resource allocated to said wireless terminal; a resource allocation determination module for determining said assigned resource and said allocated portion of said assigned resource as a function of information communicated in said multi-part resource assignment message.

Various embodiments are well suited to communication systems utilizing a recurring channel structure including well defined segments. Various embodiments are particularly useful for minimizing overhead control signaling, e.g., eliminating the need for the inclusion of a wireless terminal identifier field with the control signal information bits being communicated in a control segment. For example, in one exemplary embodiment, a set of uplink dedicated control channel segments and downlink power control segments can be allocated to a wireless terminal to use repetitively on a recurring basis by means of a single state transition message, and the wireless terminal continues to utilize those allocated resource until revocation or transition to a different state of operation. Various embodiments include features which facilitate flexible portioning of the control channel resources.

In some embodiments, a wireless communications system supports a plurality of different levels of WT ON-state operation, the different levels of wireless ON state operation supporting different amounts of resource availability. Resources include, e.g., uplink dedicated control channel segments, downlink power control segments and traffic channel segments available for assignment to the wireless terminal. Exemplary modes of On state operation include, e.g., a fulltone format dedicated control channel mode of operation, a ⅓ split tone format dedicated control channel mode of operation, and in some embodiments a ⅔ split tone format mode of operation.

The base station, in allocating resources, temporarily assigns a wireless terminal a base station assigned wireless terminal identifier, e.g., a value in the range of 1 to 31 communicated in a field of 5 bits. The base station also temporarily assigns the wireless terminal an ON state mask, e.g., the On state mask is three bits wide with the bit pattern being one of 111, 001, 010, 100, 110, 011, 101. Bit pattern=111 signifies full tone format and represents the highest level of resource; bit pattern 110 or 101 or 011 signifies a ⅔ split tone format and represents an intermediate level of resources; a bit pattern of 001 or 010 or 100 signifies a ⅓ split tone format and represents a lower level of resource. Set bit positions in a communicated mask are associated with particular resources within a recurring frequency/timing structure. A base station assigned wireless terminal identifier and a corresponding mask is communicated in a state transition assignment message. The base station manages resource allocation such that different wireless terminals are not allocated to use the same dedicated control channel resources concurrently.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
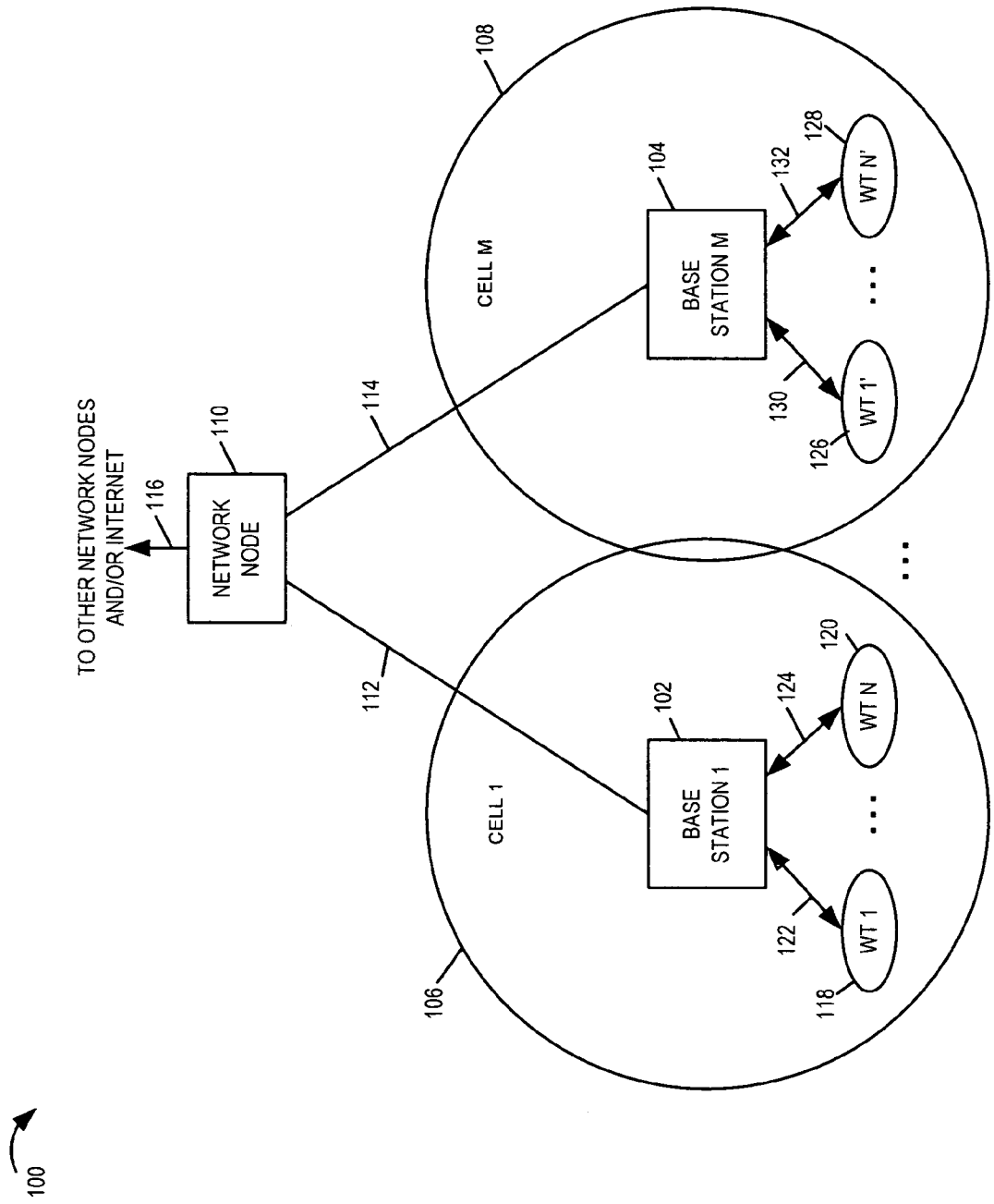
FIG. 1 is a drawing of an exemplary communication system implemented in accordance with various embodiments.

FIG. 1 is a drawing of an exemplary wireless communications system 100 in accordance with various embodiments. Exemplary wireless communications system 100 is, e.g., an exemplary multiple access orthogonal frequency division multiplexing (OFDM) wireless communications system such as a spread spectrum OFDM wireless communications system including tone hopping. Exemplary wireless communications system 100 includes a plurality of base stations (base station 1 102, . . . , base station M 104), each base station (102, 104) having a corresponding wireless coverage area (cell 1 106, cell M 108), respectively. System 100 also includes a network node 110 coupled to base stations (BS 1 102, BS M 104), via network links (112, 114), respectively. The network node 110, e.g., a router, is coupled to other network nodes, e.g., other base stations, routers, AAA nodes, home agent nodes, etc., and/or the Internet via network link 116. Network links (112, 114, 116) may be, e.g., fiber optic links, wired cable links, and/or wireless links such as, e.g., microwave links.

System 100 also includes a plurality of wireless terminals, e.g., mobile nodes. The mobile nodes may move throughout communication system 100 and establish wireless communication links with a base station in the area in which it is currently situated. A plurality of wireless terminal (WT 1 118, . . . , WT N 120) are shown coupled to base station 1 102 via wireless links (122, 124), respectively. Similarly, a plurality of wireless terminal (WT 1' 126, .... WT N' 128) are shown coupled to base station M 104 via wireless links (130, 132), respectively.

Wireless terminals in the system may be in different modes of operation, e.g., OFF, sleep, hold, $1^{st}$ type of On state, $2^{nd}$ type of On state, or $3^{rd}$ type of On state. In this exemplary embodiment, the wireless terminal can be assigned traffic channel segments while in one of the On states of operation, but is not assigned traffic channel segments while in other modes of operation, e.g., off, sleep, hold. In this exemplary embodiment, a wireless terminal is allocated different levels of some types of air link resources, e.g., uplink dedicated control channel segments and/or downlink wireless terminal power control segments, as a function of the type of On state in which the wireless terminal is operating. In this exemplary embodiment a state transition message including a base station assigned wireless terminal identifier and a corresponding On state mask is communicated to a wireless terminal to identify at least some resources allocated to the wireless terminal.

Various embodiments, may include one or more cells with more than one sector per cell, e.g., two, three or more than 3 sectors per cell. For example, in one exemplary embodiment, a base station includes three sectors and each sector includes one or more attachment points, each attachment point corresponding to an uplink/downlink tone block pair. In some such embodiments, a base station may allocate resources on a per attachment point basis.

Some embodiments include a single base station and a plurality of wireless terminals competing for resources of the base station. In some such embodiments, the single base station is connected to a backhaul network, while in other embodiments the single base station is not connected to a backhaul network.

Figure 2:
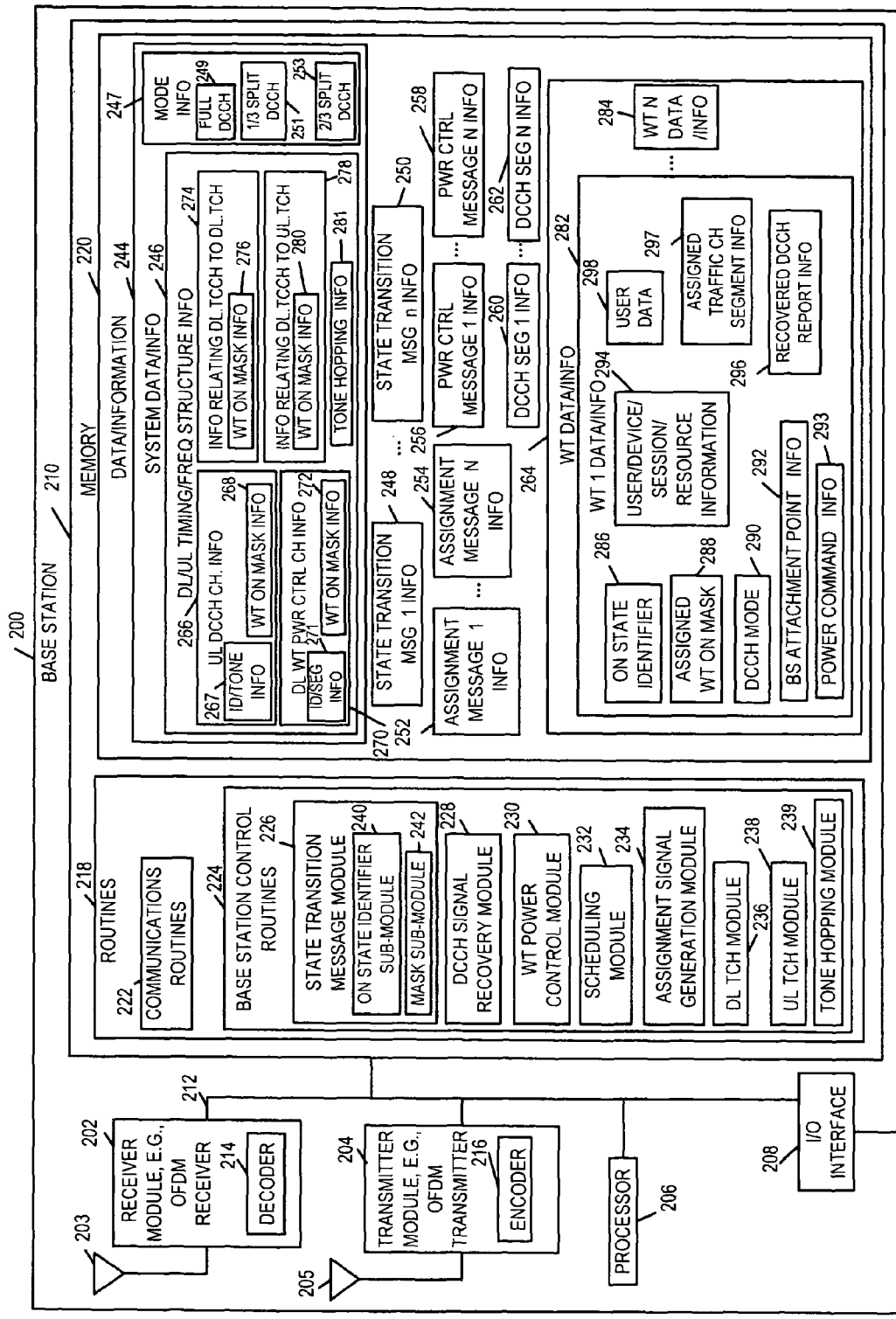
FIG. 2 is a drawing of an exemplary base station, e.g., access node, implemented in accordance with various embodiments.

FIG. 2 is a drawing of an exemplary base station 200 implemented in accordance with various embodiments. Exemplary base station 200 may one of the exemplary base stations (102, 104) of exemplary system 100 of FIG. 1. Exemplary base station 200 includes a receiver module 202, a transmitter module 204, a processor 206, an I/O interface 208, and a memory 210 coupled together via a bus 212 over which the various elements may interchange data and information.

Memory 210 includes routines 218 and data/information 220. The processor 206, e.g., a CPU, executes the routines 218 and uses the data/information 220 in memory 210 to control the operation of the base station 200 and implement methods.

Figure 3:
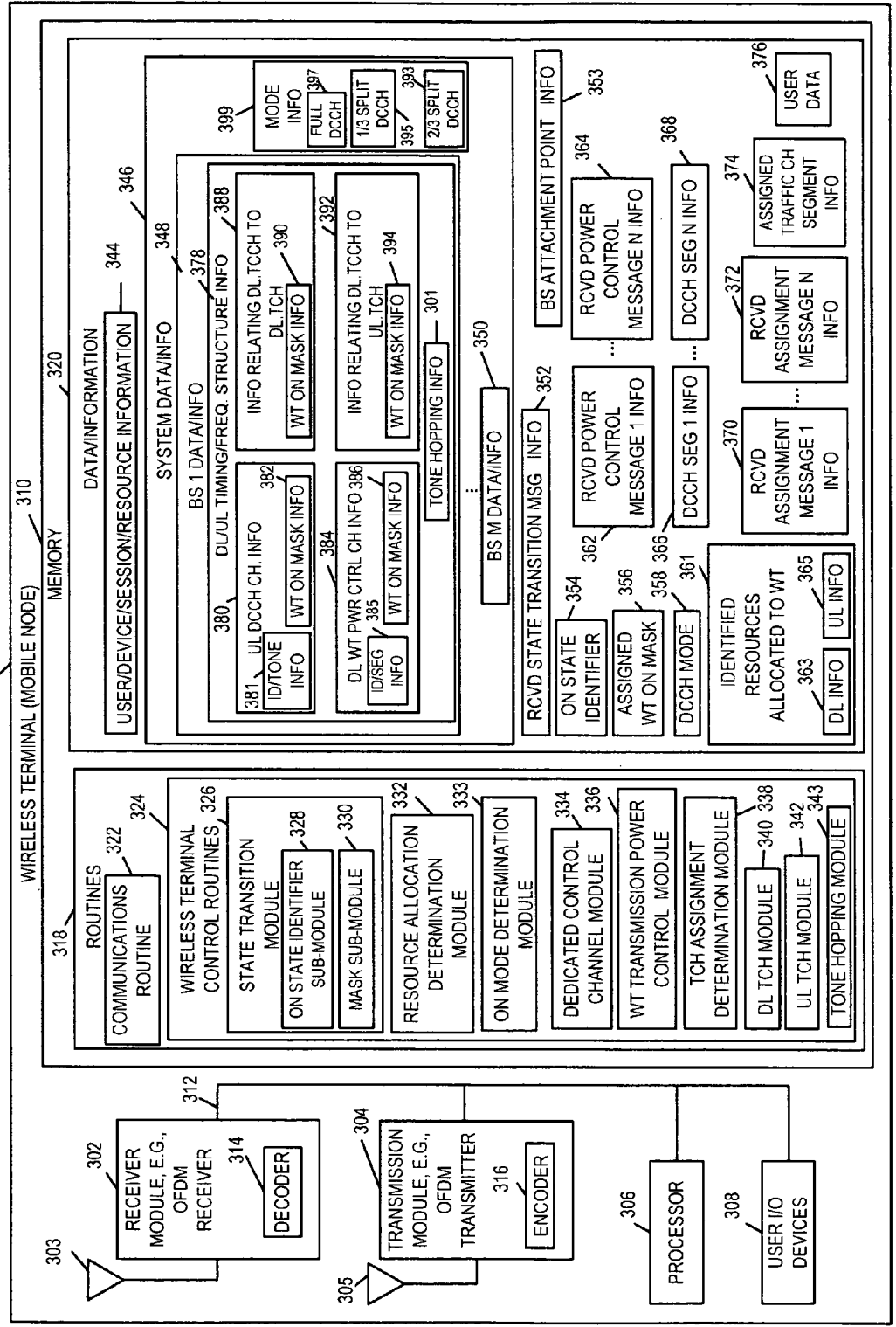
FIG. 3 is a drawing of an exemplary wireless terminal, e.g., mobile node, implemented in accordance with various embodiments.

Receiver module 202, e.g., an OFDM receiver, is coupled to receive antenna 203 via which the base station 200 receives uplink signals from wireless terminals 300 (see FIG. 3). The receiver module 202 includes a decoder 214 for decoding at least some of the received signals. Received uplink signals include: registration request signals, requests for change of state, dedicated control channel segment signals, and uplink traffic channel segment signals. Dedicated control channel segment signals are communicated using resources, e.g., dedicated control channel segments, which have been allocated previously by the base station via multi-part resource assignment messages.

Transmitter module 204, e.g., an OFDM transmitter, is coupled to transmit antenna 205, via which the base station transmits downlink signals to wireless terminals 300. Transmitter module 204 includes an encoder 216 for encoding at least some downlink signals. Downlink signals include synchronization signals such as beacon and/or pilot channel signals, state transition message signals, wireless terminal power control segment signals, traffic control channel signals including assignment signals, and downlink traffic channel segment signals. In this exemplary embodiment, state transition message signals include state transition messages commanding a wireless terminal into one of a plurality of different On states of operation, e.g., a multi-part resource assignment messages including a first part identifying a resource being assigned and a second part indicating a portion of said resource being allocated to a wireless terminal to which the multi-part resource assignment message is being directed.

I/O interface 208 couples base station 200 to other network nodes, e.g., other base stations, AAA nodes, home agent nodes, routers, content servers, etc., and/or the Internet. I/O interface 208, by coupling base station 200 to a backhaul network allows a wireless terminal using a base station 200 attachment point to participate in a communications session with a peer node using a wireless attachment point of a different base station.

Routines 218 include a communications routine 222 and base station control routines 224. The communications routines 222 implement the various communications protocols used by the base station 200. Base station control routines 224 include a state transition message module 226, a dedicated control channel signal recovery module 228, a wireless terminal power control module 230, a scheduling module 232, an assignment signal generation module 234, a downlink traffic channel module 236, an uplink traffic channel module 238, and a tone hopping module 239.

State transition message module 226 generates various state transition messages including state transition messages commanding a wireless terminal into one of a plurality of different On states of operation. One such state transition message generated by module 226 is a multi-part resource assignment message including a first part identifying a resource being assigned and a second part indicating a portion of said resource being allocated to a wireless terminal to which said multi-part resource assignment message is directed. State transition message module 226 includes an On state identifier sub-module 240 and a mask sub-module 242. The On state identifier sub-module 240 determines the On state identifier to include as the first part in the multi-part resource assignment message. The mask sub-module 242 determines the On state mask to be included as the second part in the multi-part resource assignment module. Sub-modules 240 and 242 make their determinations, for a particular multi-part resource assignment message in view of the currently available resources at the base station, wireless terminal request information, wireless terminal requirements, wireless terminal service level information and/or base station resource allocation policy.

DCCH signal recovery module 228 recovers control information reports, e.g., uplink traffic request reports, SNR reports, noise reports, interference reports, power availability reports, etc., from received signals communicated using allocated portion of resources from wireless terminals, the allocated portions having been indicated by information in the previously communicated multi-part resource assignment message. For example, the allocated portion of a resource is a set of dedicated control channel segments corresponding to a single logical dedicated control channel tone in a recurring uplink channel structure, the particular set for a wireless terminal being a function of the base station assigned wireless terminal On identifier and associated On state mask currently assigned to the wireless terminal.

Wireless terminal power control module 230 generates command control instructions for wireless terminal transmission power control, e.g., a command to increment or decrement a wireless terminal transmission power level by a predetermined amount, gain factor, or adjustment. The wireless terminal power control module 230 recognizes that particular downlink wireless terminal power control segments are currently associated with particular wireless terminals by using the On state identifier and corresponding On state mask value currently assigned to a wireless terminal and recurring downlink structure information linking individual segments to combinations of ON state identifier and mask values.

Scheduling module 232, e.g., a scheduler, schedules uplink and downlink traffic channel segments to wireless terminals in accordance with the scheduling policy of the base station. Scheduling module 232 uses On state identifier and corresponding On state mask information in determining assignment since the number and particular traffic channel segments which may be assigned to a particular wireless terminal are determined as a function of the currently assigned ON state mask associated with the wireless terminal. In this exemplary embodiment, if a wireless terminal has an On state mask of 111, the wireless terminal can be potentially assigned any uplink or downlink traffic channel segment. If a wireless terminal has an On state mask of 001, 010 or 100 the base station is precluded from assigning the wireless terminal at least some of the traffic channel segments. If a wireless terminal has an On state mask of 011, 110 or 101 the base station has more traffic channel segments available for potential assignment to the wireless terminal than if the wireless terminal has an On state mask of 001, 010 or 100.

Assignment signal generation module 234 generates traffic channel assignment signals. The traffic channel assignment signals are communicated using downlink traffic control channel air link resources. Assignment signal generation module 234 incorporates On state mask identifier information, e.g., a single bit identifier, in at least some assignment signals. In various embodiment, the number of bits of the On state mask identifier information included in the traffic channel assignment is less than the number of bits of an On state mask, e.g., 1 bit vs 3 bits.

Downlink traffic channel module 236 performs operations related to communicating downlink traffic channel segment signals, e.g., incorporating user data intended for a particular wireless terminal into signals to be communicated over a segment assigned to that particular wireless terminal. Uplink traffic channel segment module 238 performs operations including processing uplink traffic channel segment signals and associating the recovered signals with the appropriate wireless terminal to which the segment had been assigned.

Tone hopping module 238 uses the data/information 220 including tone hopping information 281 to perform uplink and downlink tone hopping. Tone hopping module 238 maps logical channel tones to physical tones used for transmission. Tone hopping module 238 hops at different rates and uses different hopping sequences for uplink and downlink tone hopping, e.g., performing downlink tone hopping in accordance with a first tone hopping sequence on each of successive OFDM symbol excluding broadcast strip channel segment intervals and performing uplink tone hopping in accordance with a second tone hopping sequence on a per dwell basis excluding access segment intervals, e.g., where a dwell is, e.g., seven successive OFDM symbol transmission time periods. Using tone hopping in conjunction with the described resource allocation features is highly advantageous since it acts toward balancing interference levels and noise levels experienced by the various wireless terminals using the base station. Thus a single problematic physical tone, from a noise and/or interference perspective, does not severely impact communications of information, e.g., control information. For example a set of dedicated control channel segment resources allocated to a wireless terminal utilizing a single logical dedicated control channel tone, by utilizing tone hopping, can act to distribute interference and/or reduce the impact of a high interference level and/or poor conditions on a single tone.

Data/information 220 includes system data/information 244, a plurality of sets of state transition message information (state transition message 1 information 248, . . . , state transition message n information 250), a plurality of assignment message information (assignment message 1 information 252, . . . , assignment message N information 254), a plurality of power control message information (power control message 1 information 256, . . . , power control message N information 258), a plurality of dedicated control channel segment information (DCCH segment 1 information 260, . . . , DCCH segment N information 262), and wireless terminal data/information 264.

Figure 5:
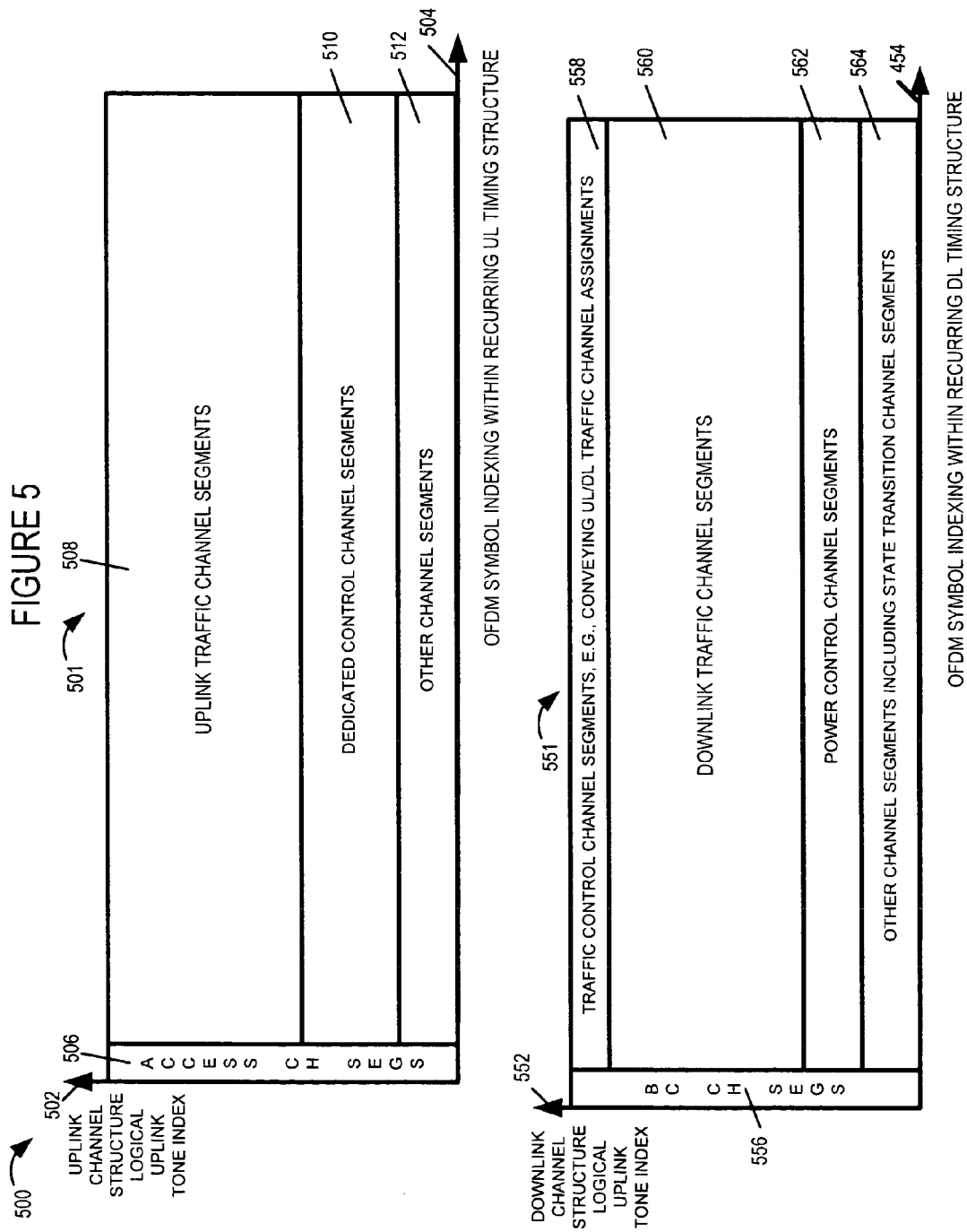
FIG. 5 is a drawing of an exemplary recurring uplink channel structure and an exemplary recurring downlink channel structure of an exemplary embodiment.
Figure 6:
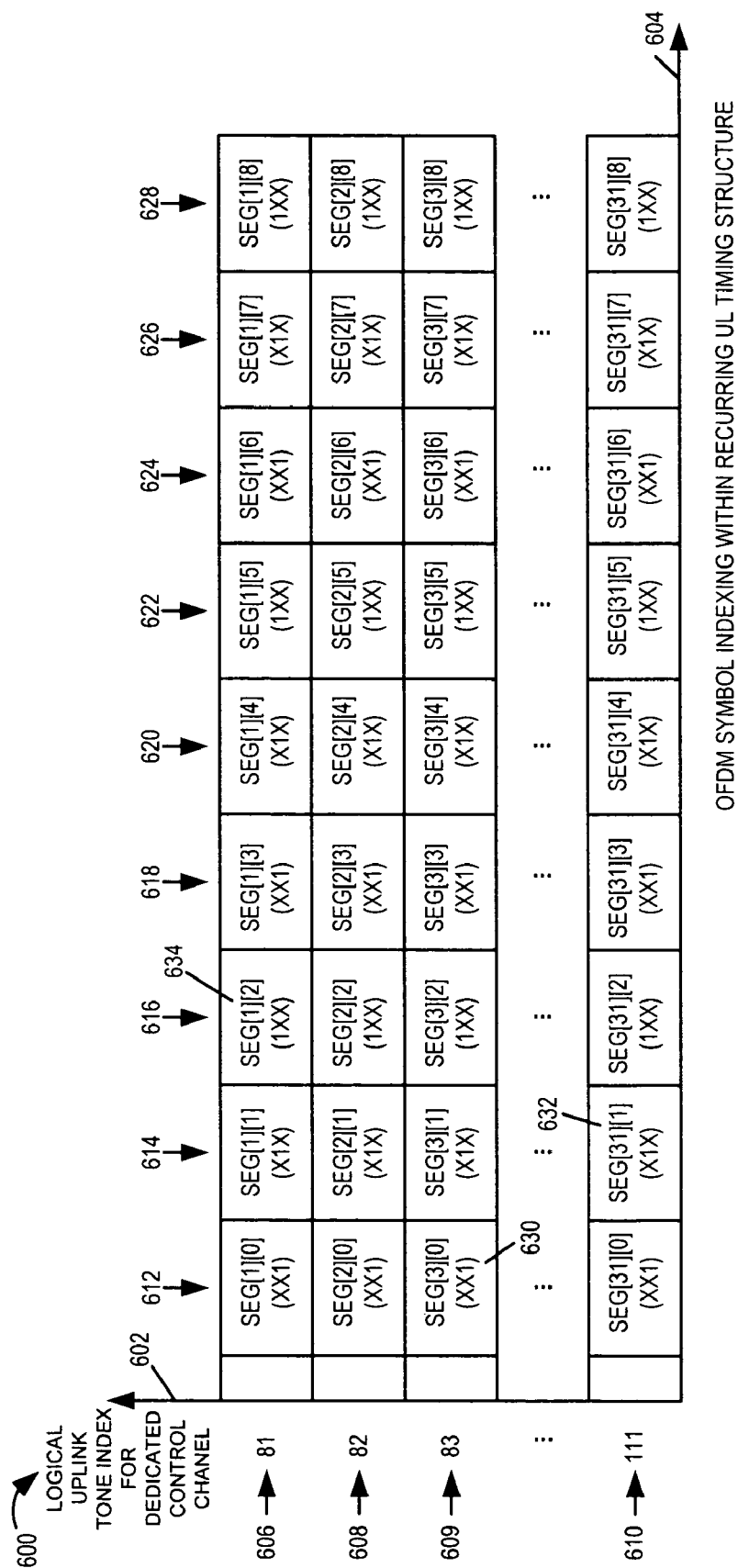
FIG. 6 is a drawing illustrating an exemplary dedicated control channel segments of a recurring structure.
Figure 7:
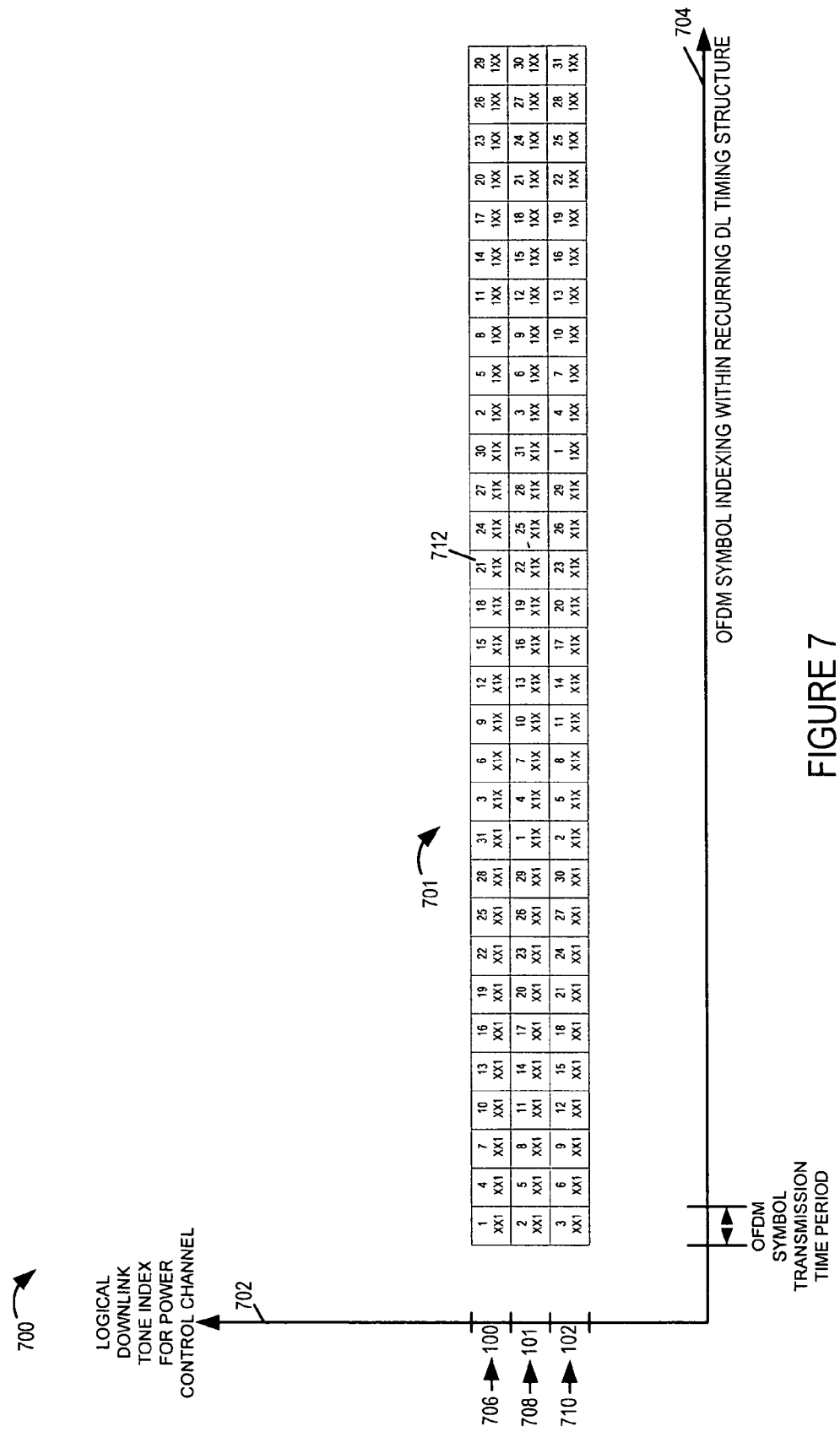
FIG. 7 is a drawing illustrating a block of exemplary power control segments in an exemplary downlink recurring channel structure.
Figure 8:
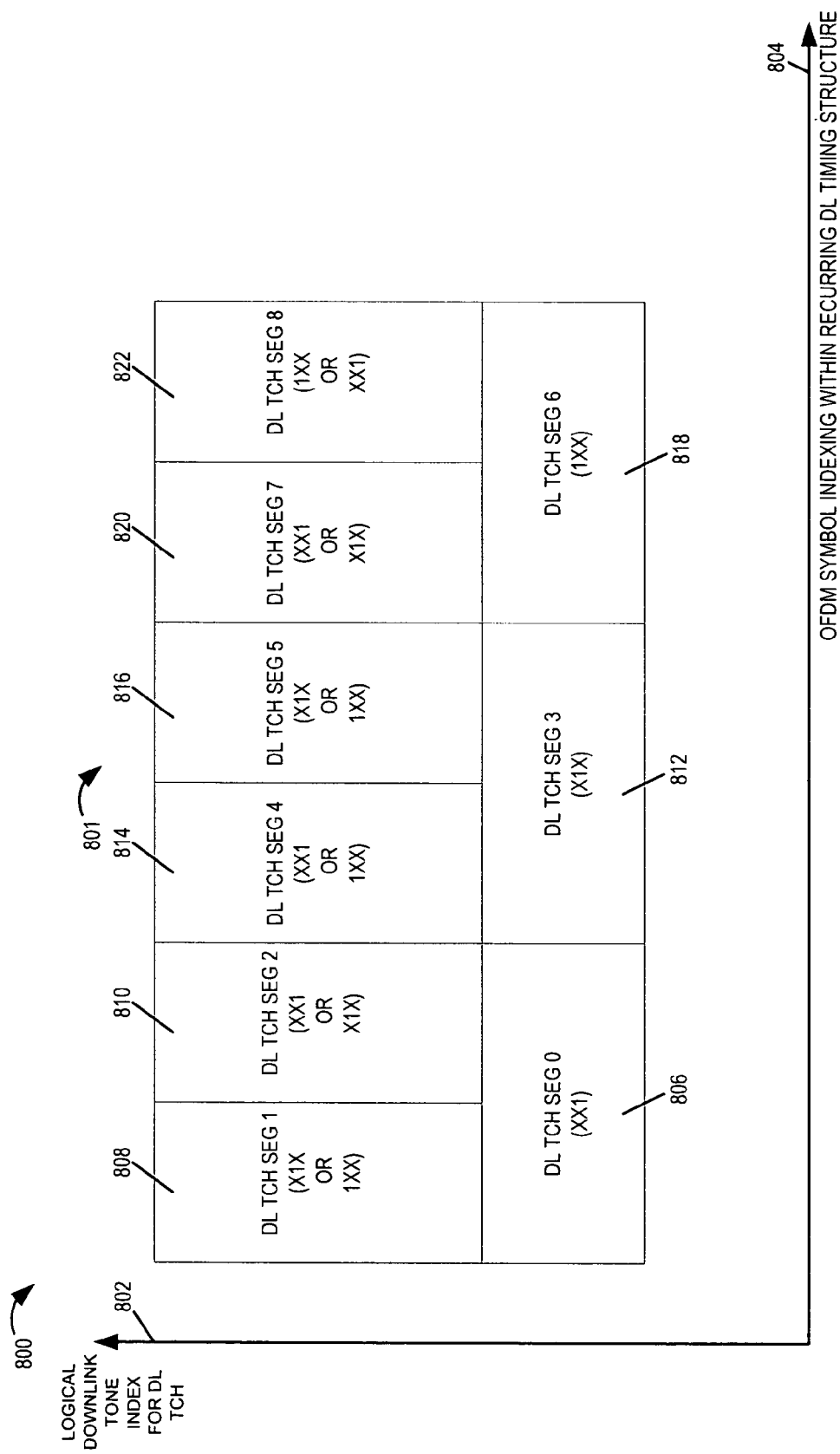
FIG. 8 is a drawing including an exemplary recurring downlink traffic channel structure.
Figure 9:
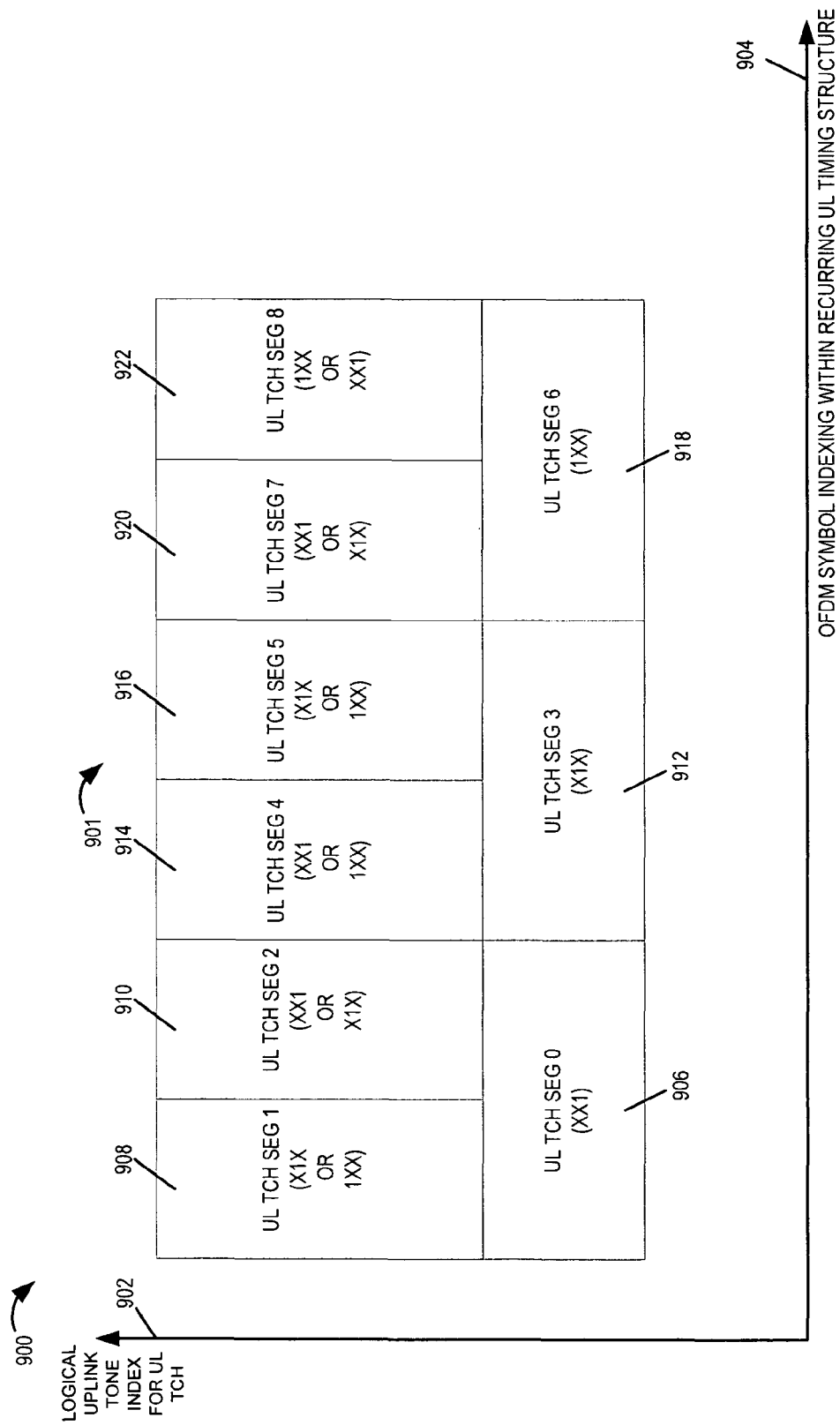
FIG. 9 is a drawing including an exemplary recurring uplink traffic channel structure.

System data/information 244 includes downlink/uplink timing/frequency structure information 246 and mode information 247. FIG. 5 illustrates exemplary downlink and uplink frequency structure information. The DL/UL timing/frequency structure information 246 includes uplink dedicated control channel information 266, downlink wireless terminal power control channel information 270, information relating downlink traffic control channel to the downlink traffic channel 274, information relating the downlink traffic control channel to the uplink traffic channel 278, and tone hopping information 281. UL DCCH channel information 266 includes wireless terminal On state identifier/dedicated control channel tone information 267 and wireless terminal ON mask information 268, e.g., information identifying an ON mask bit pattern associated with a dedicated control channel segment in a recurring channel structure being used by the base station. FIG. 6 and the corresponding description describe exemplary information 267 and 268. DL WT power control channel information 270 includes wireless terminal On state identifier/segment set association information 271 and wireless terminal ON mask information 272, e.g., information identifying an ON mask bit pattern associated with a downlink power control channel segment in a recurring channel structure being used by the base station. FIG. 7 and the corresponding description describe exemplary information 271 and 272. Information relating downlink traffic control channel to downlink traffic channel 274 includes wireless terminal On mask information 276, e.g., information identifying: which wireless terminal ON masks are associated with which assignment slots, which wireless terminal On masks are associated with which downlink traffic channel segments, and assignment mask identifier information. FIG. 8 and the corresponding text describe some exemplary information 276. Information relating downlink traffic control channel to uplink traffic channel 278 includes wireless terminal On mask information 280, e.g., information identifying: which wireless terminal ON masks are associated with which assignment slots, which wireless terminal On masks are associated with which uplink traffic channel segments, and assignment mask identifier information. FIG. 9 and the corresponding text describe some exemplary information 280. Tone hopping information 281 includes uplink tone hopping information used to map uplink logical channel tones to uplink physical tones and downlink tone hopping information used to map downlink logical channel tones to downlink physical tones.

Mode information 247 includes full tone format DCCH mode information 249, ⅓ split tone format DCCH mode information 251 and ⅔ split tone format DCCH mode information 253. Full tone format DCCH mode information 249 include information associating an On state bit mask pattern of 111 with a full tone format DCCH mode of ON state operation, e.g., a high state of resource allocation. ⅓ split tone format DCCH mode information 251 includes information associating an On state bit mask patterns of 001, 010, and 100 with a ⅓ split tone format DCCH mode of ON state operation, e.g., a low state of resource allocation. ⅔ split tone format DCCH mode information 253 includes information associating an On state bit mask patterns of 110, 101, and 011 with a ⅔ split tone format DCCH mode of ON state operation, e.g., an intermediate state of resource allocation.

Figure 13:
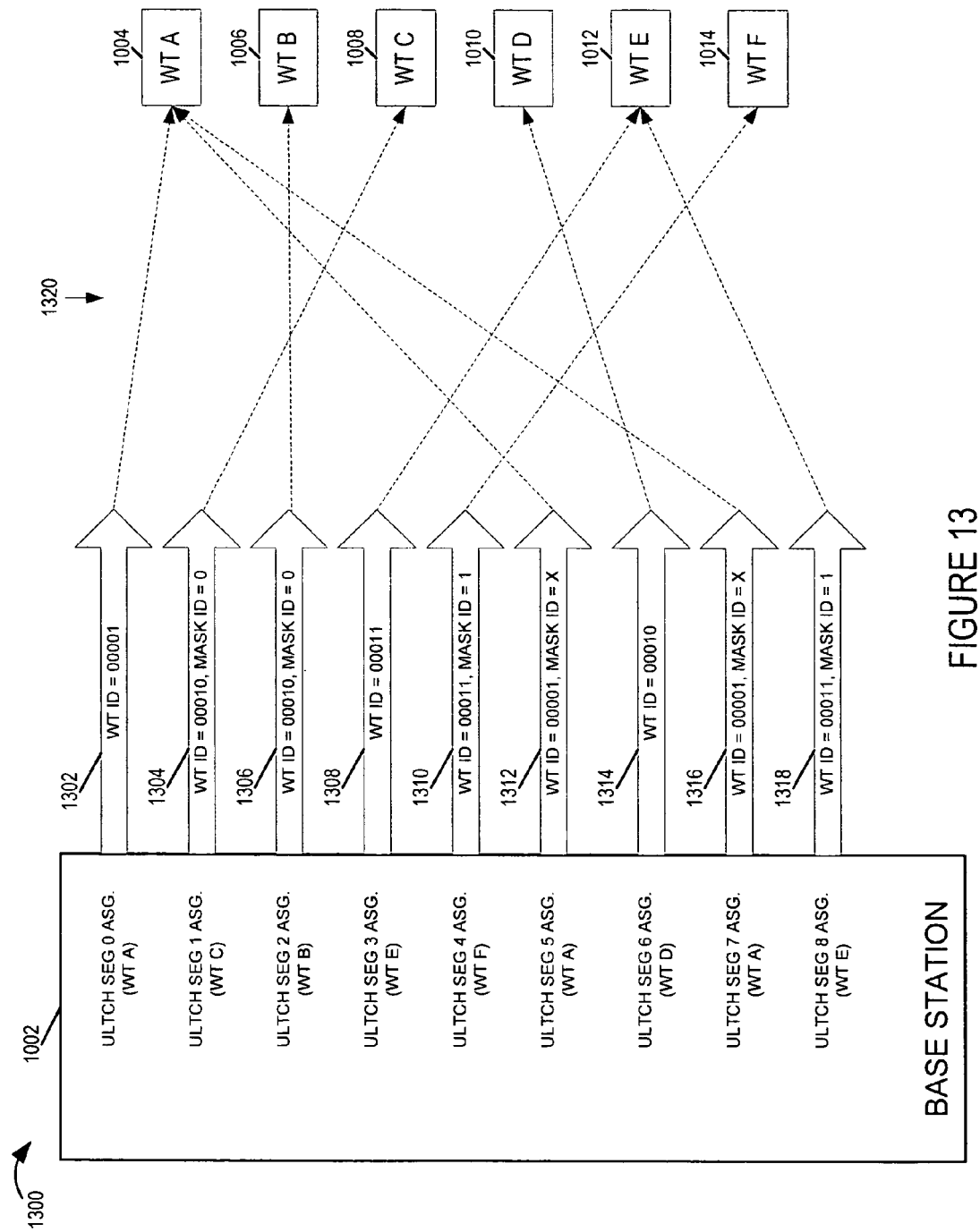
FIG. 13 is a drawing illustrating exemplary assignment and assignment information signaling corresponding to uplink traffic channel segments.
Figure 14:
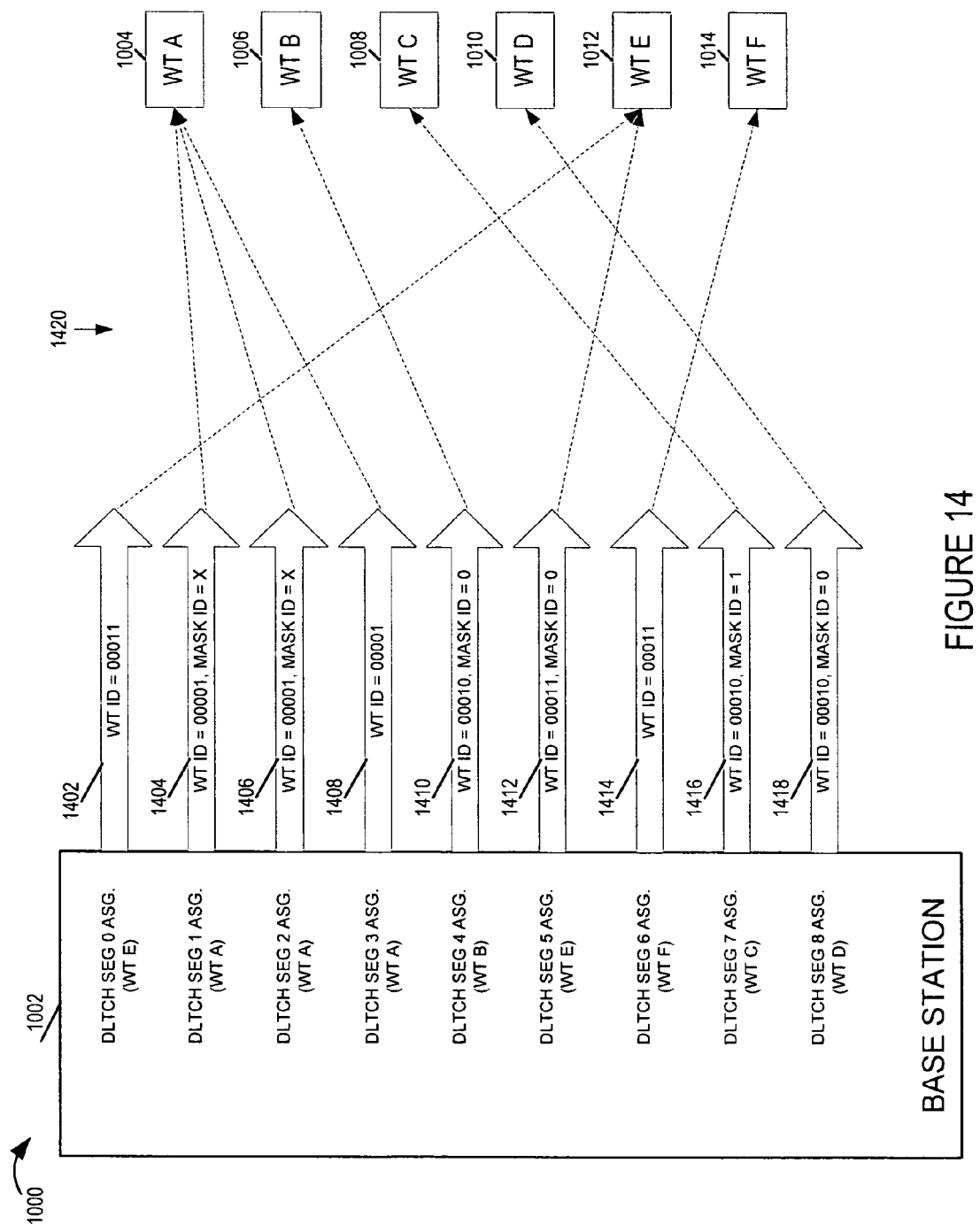
FIG. 14 is a drawing illustrating exemplary assignment and assignment information signaling corresponding to downlink traffic channel segments.

State transition message 1 information 248 includes information of a state transition message, e.g., a multi-part resource assignment message directed to a wireless terminal commanding the wireless terminal into one of a plurality of On states of operation and allocating dedicated resources in a recurring channel structure for use by the wireless terminal. The state transition message is generated by state transition message module 226. Assignment message 1 information 252 includes information in an assignment message, e.g., a traffic control channel message conveying one or more traffic channel slot assignments, the message generated by assignment signal generation module 234. FIGS. 13 and 14 illustrate some exemplary traffic channel assignment signaling. Power control message 1 information 256 includes wireless terminal transmission power command signaling information. DCCH segment 1 information 260 includes information communicated in a dedicated control segment, e.g., information to be processed by DCCH signal recovery module 228.

Figure 4:
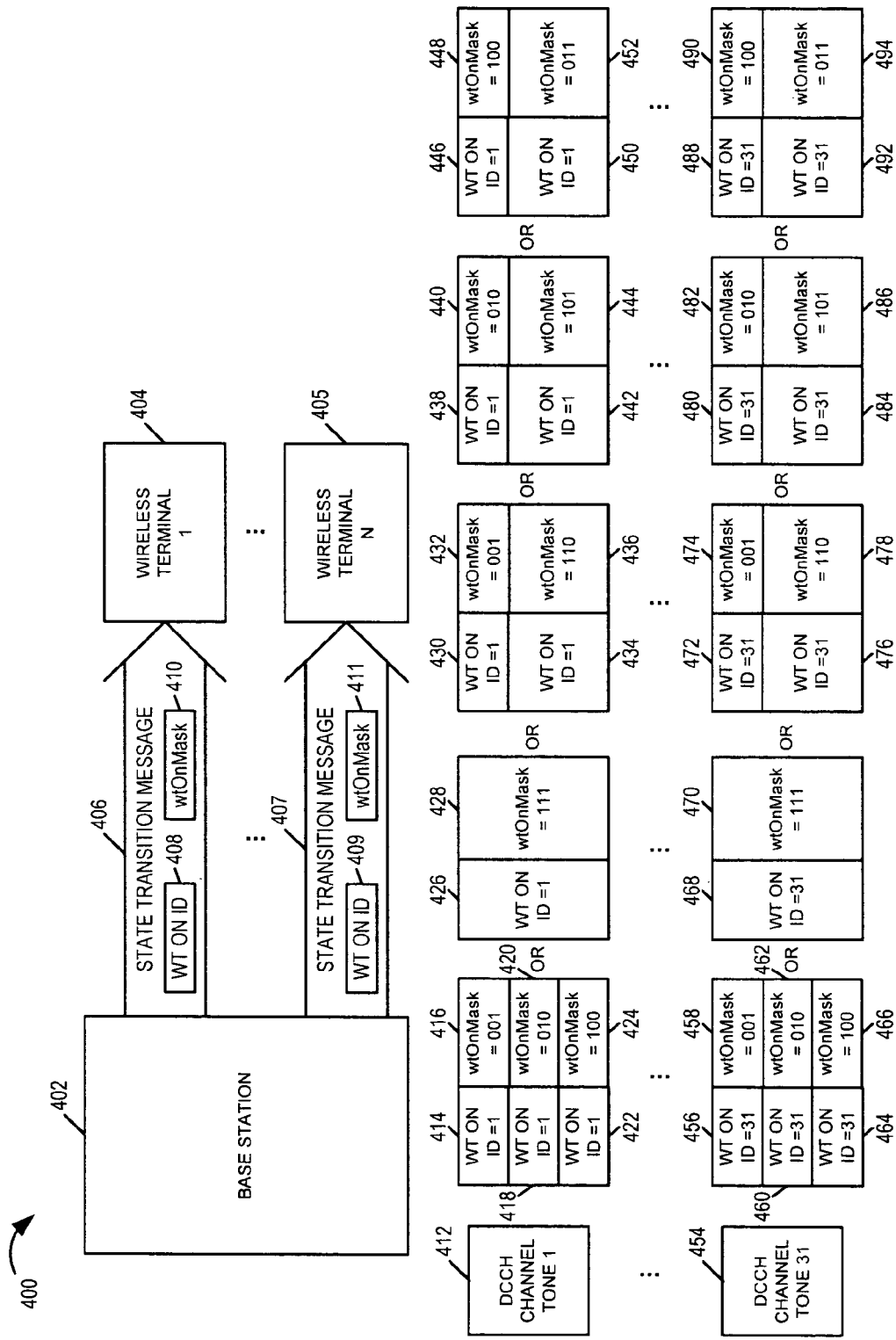
FIG. 4 is a drawing illustrating an exemplary base station, exemplary wireless terminals, exemplary state transition message signaling, and information relating to various modes of wireless terminals operation.
Figure 10:
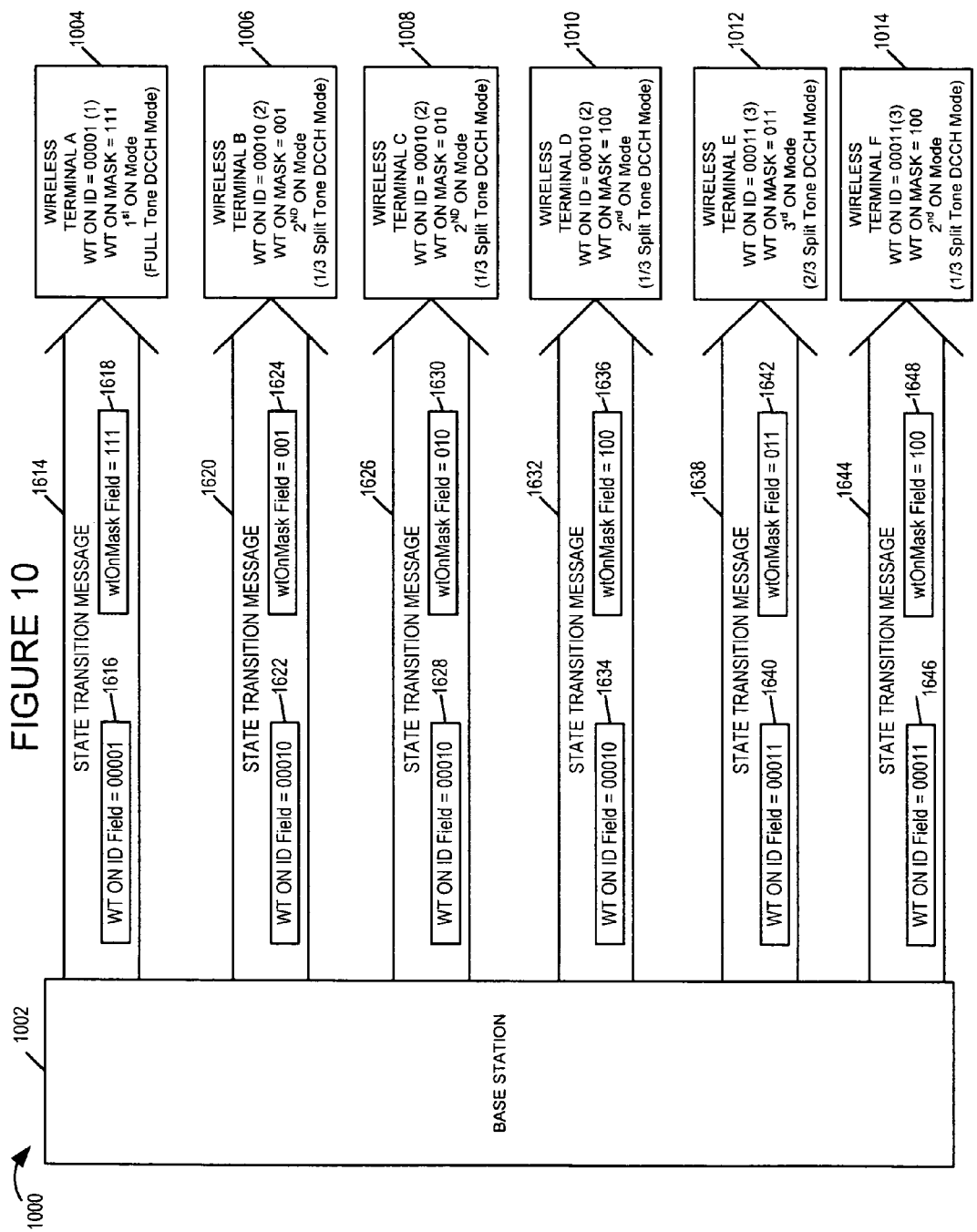
FIG. 10 is a drawing illustrating exemplary state transition message signaling conveying base station assigned wireless terminal identifiers and corresponding masks to a plurality of wireless terminals.

Wireless terminal data/information 264 includes a plurality of sets of wireless terminal data/information (WT 1 data/information 282, ... , WT N data/information 284). WT 1 data/information 282 includes an ON state identifier 286, an assigned WT On mask 288, a dedicated control channel mode 290, base station attachment point information 292, power command information 293, user/device/session/resource information 294, recovered DCCH report information 296, assigned traffic channel segment information 297 and user data 298. WT On state identifier 286 is an ON state identifier currently associated with WT 1, while assigned WT On mask 288 is a corresponding On mask currently associated with WT 1. The base station 200 allocates On state identifiers and corresponding On mask to wireless terminal from available resources. FIG. 4 illustrate potential allocations of On state identifiers and masks for an exemplary embodiment. FIG. 10 also illustrates exemplary allocation of On state identifiers and corresponding masks to several exemplary wireless terminals.

DCCH mode 290 identifies the dedicated control channel mode of operation of WT 1 in accordance with the On state identifier and assigned wireless terminal On mask 288, e.g., one of full tone format DCCH mode, ⅓ split tone format DCCH mode and ⅔ split tone format DCCH mode. Base station attachment point information 292 identifies the sector and/or tone block which WT 1 is using as its current point of network attachment. Power command information 293 includes a wireless terminal transmission power control command, e.g., increment or decrement transmission power level in accordance with one step, a predetermined amount, or a predetermined gain adjustment. Power command information for WT 1 293 is incorporated into a power control message and communicated in a segment allocated to WT 1. In some embodiments, the power control message is communicated via a single OFDM modulation symbol. Recovered DCCH segment information 296 is an output of DCCH signal recovery module 228 and includes, e.g., uplink traffic channel request information, beacon ratio report information, signal to noise ratio report information, self-noise report information, and wireless terminal transmission power report information. Assigned traffic channel segment information 297 includes assignment information pertinent to be communicated in an traffic channel assignment message, e.g., message 252. User data 376 includes, e.g., voice, audio, data, image data, text data, file data, etc., which is communicated in uplink and/or downlink traffic channel segments assigned to the wireless terminal.

FIG. 3 is a drawing of an exemplary wireless terminal 300, e.g., mobile node implemented in accordance with various embodiments. Exemplary wireless terminal 300 may be any of the wireless terminals (118, 120, 126, 128) of system 100 of FIG. 1. Exemplary wireless terminal 300 includes a receiver module 302, a transmission module 304, a processor 306, user I/O devices 308, and a memory 310 coupled together via a bus 312 over which the various elements may interchange data and information.

Memory 310 includes routines 318 and data/information 320. The processor 306, e.g., a CPU, executes the routines 318 and uses the data/information 320 in memory 310 to control the operation of the wireless terminal 300 and implement methods.

Receiver module 302, e.g., an OFDM receiver, is coupled to receive antenna 303 via which the wireless terminal 300 receives downlink signals from base stations 200. Receiver module 302 includes a decoder 314 for decoding at least some of the received downlink signals. Received downlink signals include: timing/synchronization signals such as beacon and/or pilot channel signals, state transition message signals, power control channel segment signals, traffic control channel assignment signals, and downlink traffic channel segment signals. In this exemplary embodiment, state transition message signals include state transition messages commanding a wireless terminal into one of a plurality of different On states of operation, e.g., a multi-part resource assignment messages including a first part identifying a resource being assigned and a second part indicating a portion of said resource being allocated to a wireless terminal to which the multi-part resource assignment message is being directed.

Transmission module 304, e.g., an OFDM transmitter, is coupled to transmit antenna 305, via which the wireless terminal 300 transmits uplink signals to base stations 200. Transmission module 304 includes an encoder 316 for encoding at least some of the uplink signals. In some embodiments, the same antenna is used for receiver and transmitter, e.g., in conjunction with a duplex module. Uplink signals include; registration request signals, request for a change of state, dedicated control channel segment signals, and traffic channel segment signals.

User I/O devices 308, e.g., microphone, keypad, keyboard, switches, camera, speaker, display, etc., allow a user of wireless terminal 300 to input data/information, access output data/information, control applications, and control at least some functions of the wireless terminal, e.g., initiate a communications session.

Routines 318 include a communications routine 332 and wireless terminal control routines 324. The communications routine 332 implements various communications protocols used by the wireless terminal 300. The wireless terminal control routines 324 include a state transition module 326, a resource allocation determination module 332, an On mode determination module 333, a dedicated control channel module 334, a wireless terminal transmission power control module 336, a traffic channel assignment determination module 338, a downlink traffic channel module 340, an uplink traffic channel module 342, and a tone hopping module 343.

State transition message module 326 processes received state transition messages including multi-part resource assignment messages including an On state identifier and a corresponding On state mask. State transition module 326 includes an ON state identifier sub-module 328 and a On state mask sub-module 330. On state identifier sub-module 328 recovers a base station assigned wireless terminal On state identifier 354 currently assigned to the wireless terminal, e.g., a value in the range of 1 . . . 31 communicated in a 5 bit field. Mask sub-module 330 recovers a base station assigned wireless terminal On state mask 356, e.g., one of 111, 001, 010, 100, 110, 101 and 011, communicated via a three bit field. The recovered On state identifier and corresponding mask are intended for use by the wireless terminal to determine allocated resources, e.g., in recurring channel uplink and/or downlink structures known to both the base station and wireless terminal. In addition, the recovered On state identifier and corresponding mask are intended for use by the wireless terminal to determine an On state mode of operation and to determine traffic channel assignments relevant to the wireless terminal.

On mode determination module 333 uses the assigned wireless terminal On mask 356 and mode information 399 to determine the On state mode of operation in which the wireless terminal is to be operated, e.g., if the assigned WT On mask=111, the wireless terminal is to be operated in full tone format DCCH mode of operation; if the assigned WT On mask is one of 001, 010 and 100, the wireless terminal is to be operated in a ⅓ split tone format DCCH mode of operation; if the assigned WT On mask is one of 110, 011 and 101, the wireless terminal is to be operated in a ⅔ split tone format DCCH mode of operation. DCCH mode information 358 is an output of On mode determination module 333.

Resource allocation determination module 332 determines assigned resources and allocated portions of the assigned resources as a function of the On state identifier 354 and assigned wireless terminal On mask 356. Identified resources allocated to the wireless terminal 361 is an output of module 332. Identified resources allocated to the wireless terminal 361 includes downlink allocated resources information 363 and uplink allocated resources information 365. Downlink allocated resources information 363 includes information identifying sets of downlink wireless terminal power control segments and information identifying portions of the set with a recurring downlink channel structure. For example consider that the set of downlink segments representing an assigned resource is the set of three segments in FIG. 7 associated with wireless terminal On state identifier=2, and consider that the WT is WTB (with On mask=001) with respect to FIG. 12, the allocated downlink resource includes segment 1218. Uplink allocated resources information 365 includes information identifying uplink dedicated control channel tones and sets of allocated uplink dedicated control channel segments allocated to the wireless terminal within a recurring uplink channel structure. For example, consider that tone 82 of FIG. 11, which corresponds to base station assigned wireless terminal On state identifier=2, represents an assigned uplink resource, consider that the wireless terminal is WTB, then the allocated resource corresponds to tone 82 during the time intervals of columns 1112, 1118 and 1124, or in other words uplink dedicated control channel segment [2][0], segment [2][3] and segment [2][6].

Dedicated control channel module 334 generates various uplink reports and generates dedicated control channel segment signals to convey the reports, the reports to be communicated using the allocated dedicated control channel segments corresponding to the On state identifier 354 and On state mask 356. Exemplary reports generated by module 334 include uplink traffic request reports, interference reports, noise reports, transmission power reports and SNR reports.

Wireless terminal transmission power control module 336 processes received power control commands directed to the wireless terminal communicated via downlink resources allocated to the wireless terminal, e.g., segments allocated to the wireless terminal in accordance with the on state identifier 354 and On state mask 356. Wireless terminal transmission power control module 336 controls transmission module 304 to perform adjustments in accordance with the recovered commands.

Traffic channel assignment determination module 338 determines which traffic channel segments may be assigned to the wireless terminal given its current assigned ON state identifier 354 and corresponding assigned ON mask 356. Module 338 also determines which traffic channel segments are assigned to the wireless terminal. In this exemplary embodiment, there is a fixed predetermined relationship in the recurring channel structure between an assignment slot and a corresponding traffic channel segment. Module 338 uses assigned ON state identifier 354, assigned On mask 356, information relating downlink traffic control channel to downlink traffic channel 388 and/or information relating downlink traffic control channel to uplink traffic channel 392 in performing various operations. For example, some assignment slots are not available as a function of an ON state mask. As another example, some traffic channel assignments include a On mask identifier, e.g., a single bit distinguishing between two different On state bit masks which may be associated with the traffic channel segment.

Downlink traffic channel module 340 recovers user data from received traffic channel segment signals communicated over traffic channel segments which have been assigned to the wireless terminal. Uplink traffic channel module 342 generates uplink traffic channel segment signals to be communicated over uplink traffic channel segments which have been assigned to the wireless terminal.

Tone hopping module 343 uses the data/information 320 including tone hopping information 301 to perform uplink and downlink tone hopping. Tone hopping module 343 maps logical channel tones to physical tones used for transmission. Tone hopping module 343 hops at different rates and uses different hopping sequences for uplink and downlink tone hopping, e.g., performing downlink tone hopping in accordance with a first tone hopping sequence on each of successive OFDM symbol excluding broadcast strip channel segment intervals and performing uplink tone hopping in accordance with a second tone hopping sequence on a per dwell basis excluding access segment intervals, e.g., where a dwell is, e.g., seven successive OFDM symbol transmission time periods. Using tone hopping in conjunction with the described resource allocation features is highly advantageous since it acts toward balancing interference levels and noise levels experienced by the various wireless terminals using the base station. Thus a single problematic physical tone, from a noise and/or interference perspective, does not severely impact communications of information, e.g., control information, for wireless terminal 300. For example a set of dedicated control channel segment resources is allocated to wireless terminal 300 corresponding to a single logical dedicated control channel tone and wireless terminal 300 by utilizing tone hopping, can act to distribute interference and/or reduce the impact of a high interference level and/or poor conditions on a single physical tone.

Data/information 320 includes user/device/session/resource information 344, system data/information 346, received state transition message information 352, base station attachment point information 353, an ON state identifier 354, an assigned WT ON mask 356, a dedicated control channel mode of operation 358, identified resources allocated to the wireless terminal 361, a plurality of received power control messages (received power control message 1 information 362, . . . , received power control message N information 364), a plurality of dedicated control channel segment sets of information (dedicated control channel segment 1 information 366, . . . , dedicated control channel segment N information 368), a plurality of sets of received assignment message information (received assignment message 1 information 370, . . . , received assignment message N information 372), assigned traffic channel segment information 374, and user data 376.

User device/session/resource information 344 includes device identification information, ongoing communication session information including peer node information, routing, addressing information and various session state information. Received state transition message information 352 includes information corresponding to multi-part resource assignment messages. Received state transition message information 352 includes information input to state transition module 326. Base station attachment point information 353 includes information identifying the base station which the wireless terminal is using as its current point of network attachment, e.g., a base station identifier information, base station sector identifier information, base station carrier frequency information, and/or base station tone block identification information. On state identifier 354 is a base state assigned wireless terminal On state identifier, e.g., a value in the range 1 . . . 31, communicated by a state transition message and determined by On state identifier sub-module 328, the temporarily assigned identifier to be associated with various communications resources in the recurring channel structure. The wireless terminal may also have additional base station assigned identifiers, e.g., a registered user identifier and/or a base station assigned active user identifier which are relevant to other mode of operation such as states of operation in which the user cannot be assigned traffic channel segments, e.g., a Hold state, a sleep state, etc. Assigned On state mask 356 is a base station assigned On state mask, e.g., one of 111, 001, 100, 010, 110, 101 and 011, communicated in a state transition message and determined by mask sub-module 330, the temporarily assigned mask to be used for operations including in determining allocated portions of assigned resources. DCCH mode 358, e.g., one a full tone format mode, ⅓ split tone format mode, and ⅔ split tone format mode, is an output of On mode determination module 333.

Identified resources allocated to the wireless terminal 361 is an output of resource allocation determination module 332. Identified resources allocated to the wireless terminal 361 includes downlink resource allocation information 363, e.g., information identifying downlink wireless terminal power control channel segments allocated to the wireless terminal, and uplink resource allocation information 365, e.g., an uplink dedicated control channel logical tone assigned to the wireless terminal and information identifying allocated dedicated control segments allocated to the wireless terminal.

Received power control message information 362 includes information input to wireless terminal power control module 336 and information output from module 336 to be used to adjust transmitter 304. DCCH segment 1 information 366 includes information, e.g., report information, and generated signals to be communicated in a DCCH segment allocated to the wireless terminal.

Received assignment message 1 information 370 includes information corresponding to a traffic control channel message which is processed by module 338. Assigned traffic channel segment information 374 is an output of traffic channel assignment determination module 338 and includes information identifying traffic channel segments in the recurring uplink and/or downlink traffic channel structure which are currently assigned to the wireless terminal. User data 376 includes, e.g., voice, audio, data, image data, text data, file data, etc., which is communicated in uplink and/or downlink traffic channel segments assigned to the wireless terminal.

System data/information 346 includes a plurality of sets of base station data/information (base station 1 data/information 348, . . . , base station M data/information 350) and mode information 399. Base station 1 data/information 348 includes downlink/uplink timing/frequency structure information 378. FIG. 5 illustrates exemplary downlink and uplink frequency structure information. The DL/UL timing/frequency structure information 378 includes uplink dedicated control channel information 380, downlink wireless terminal power control channel information 384, information relating downlink traffic control channel to the downlink traffic channel 388, information relating the downlink traffic control channel to the uplink traffic channel 392, and tone hopping information 301. UL DCCH channel information 380 includes wireless terminal On state identifier/dedicated control channel tone association information 381 and wireless terminal ON mask information 382, e.g., information identifying an ON mask bit pattern associated with a dedicated control channel segment in a recurring channel structure being used by the base station. FIG. 6 and the corresponding description describes exemplary information 381 and 382. DL WT power control channel information 384 includes wireless terminal On state identifier/downlink power control segment set association information 385 and wireless terminal ON mask information 386, e.g., information identifying an ON mask bit pattern associated with a downlink power control channel segment in a recurring channel structure being used by the base station. FIG. 7 and the corresponding description describe exemplary information 385 and 386. Information relating downlink traffic control channel to downlink traffic channel 388 includes wireless terminal On mask information 390, e.g., information identifying: which wireless terminal ON masks are associated with which assignment slots, which wireless terminal On masks are associated with which downlink traffic channel segments, and assignment mask identifier information. FIG. 8 and the corresponding text describe some exemplary information 390. Information relating downlink traffic control channel to uplink traffic channel 392 includes wireless terminal On mask information 394, e.g., information identifying: which wireless terminal ON masks are associated with which assignment slots, which wireless terminal On masks are associated with which uplink traffic channel segments, and assignment mask identifier information. FIG. 9 and the corresponding text describe some exemplary information 394. Tone hopping information 301 includes uplink tone hopping information used to map uplink logical channel tones to uplink physical tones and downlink tone hopping information used to map downlink logical channel tones to downlink physical tones.

Mode information 399 includes full tone format DCCH mode information 397, ⅓ split tone format DCCH mode information 395 and ⅔ split tone format DCCH mode information 393. Full tone format DCCH mode information 397 include information associating an On state bit mask pattern of 111 with a full tone format DCCH mode of ON state operation, e.g., a high state of resource allocation. ⅓ split tone format DCCH mode information 395 includes information associating an On state bit mask patterns of 001, 010, and 100 with a ⅓ split tone format DCCH mode of ON state operation, e.g., a low state of resource allocation. ⅔ split tone format DCCH mode information 397 includes information associating an On state bit mask patterns of 110, 101, and 011 with a ⅔ split tone format DCCH mode of ON state operation, e.g., an intermediate state of resource allocation.

FIG. 4 is a drawing 400 illustrating an exemplary base station 402, exemplary wireless terminals (wireless terminal 1 404, . . . , wireless terminal N 405), exemplary state transition message signaling (state transition message 406, . . . , state transition message 407), and information relating to various modes of wireless terminals operation. Base station 402 may exemplary base station 200 of FIG. 2, while a wireless terminal (404, . . . , 405) may be a wireless terminal 300 of FIG. 3. In the example, state transition message 406 is sent from base station 402 to wireless terminal 1 404, while state transition message 407 is sent from base station 402 to wireless terminal N 405. State transition message 406 includes a base station assigned wireless terminal identifier 408, e.g., a 5 bit field value in the range 1 . . . 31, and a wireless terminal On state mask value 410, e.g., a 3 bit field value. State transition message 407 includes a base station assigned wireless terminal identifier 409, e.g., a 5 bit field value in the range 1 . . . 31, and a wireless terminal On state mask value 411, e.g., a 3 bit field value. In the example of drawing 400, the value of the wireless terminal On state identifier in the wireless terminal On identifier field of a state transition message, can correspond to one of 31 dedicated control channel tones (dedicated control channel tone 1 412, . . . , dedicated control channel tone 31 454).

In this example, corresponding to a single dedicated control channel tone, the base station can assign: (i) up to 3 different wireless terminal in ⅓ split tone format the same tone to use on a time share basis for dedicated control channel signaling, (ii) one wireless terminal to a tone to be use exclusively for dedicated control channel signaling, or (iii) up to one wireless terminal in ⅓ split tone format and up to one wireless terminal in ⅔ split tone format to use the same tone on a time share basis for dedicated control channel signaling.

Consider that base station 402 has decided that three wireless terminals are to operate in ⅓ split tone format corresponding to dedicated control channel tone 1. The base station 402 sends three different state transition messages to three different wireless terminals. First state transition message includes a wireless terminal on state identifier=00001 414 and a wtOnMask=001 416. Second state transition message includes a wireless terminal on state identifier=00001 418 and a wtOnMask=010 420. Third state transition message includes a wireless terminal on state identifier=00001 422 and a wtOnMask=100 424.

Now alternatively consider that base station 402 has decided that one wireless terminal is to operate in full tone format corresponding to dedicated control channel tone 1. The base station 402 sends a state transition messages to the wireless terminal to be operated in full tone format mode. The state transition message includes a wireless terminal on state identifier=00001 426 and a wtOnMask=111 428.

Now alternatively consider that the base station 402 has decided that one wireless terminal is to operate in ⅓ split tone format and one wireless terminal is to operate in ⅔ split tone format corresponding to the dedicated control channel tone 1. Three different alternatives are possible. In a first alternative, the base station sends a first state transition message to a first wireless terminal including a base station assigned wireless terminal identifier=00001 430 and a wtOnMask=001 432 and second state transition message to a second wireless terminal including a base station assigned wireless terminal identifier=00001 434 and a wtOnMask=110 436. In a second alternative, the base station sends a first state transition message to a first wireless terminal including a base station assigned wireless terminal identifier=00001 438 and a wtOnMask=010 440 and second state transition message to a second wireless terminal including a base station assigned wireless terminal identifier=00001 442 and a wtOnMask=101 444. In a third alternative, the base station sends a first state transition message to a first wireless terminal including a base station assigned wireless terminal identifier=00001 446 and a wtOnMask=100 448 and second state transition message to a second wireless terminal including a base station assigned wireless terminal identifier=00001 450 and a wtOnMask=011 452.

Similarly consider that base station 402 has decided that three wireless terminals are to operate in ⅓ split tone format corresponding to dedicated control channel tone 31. The base station 402 sends three different state transition messages to three different wireless terminals. First state transition message includes a wireless terminal on state identifier=11111 456 and a wtOnMask=001 458. Second state transition message includes a wireless terminal on state identifier=11111 460 and a wtOnMask=010 462. Third state transition message includes a wireless terminal on state identifier=11111 464 and a wtOnMask=100 466.

Now alternatively consider that base station 402 has decided that one wireless terminal is to operate in full tone format corresponding to dedicated control channel tone 31. The base station 402 sends a state transition messages to the wireless terminal to be operated in full tone format mode. The state transition message includes a wireless terminal on state identifier=11111 468 and a wtOnMask=111 470.

Now alternatively consider that the base station 402 has decided that one wireless terminal is to operate in ⅓ split tone format and one wireless terminal is to operate in ⅔ split tone format corresponding to the dedicated control channel tone 31. Three different alternatives are possible. In a first alternative, the base station sends a first state transition message to a first wireless terminal including a base station assigned wireless terminal identifier=11111 472 and a wtOnMask=001 474 and second state transition message to a second wireless terminal including a base station assigned wireless terminal identifier=11111 476 and a wtOnMask=110 478. In a second alternative, the base station sends a first state transition message to a first wireless terminal including a base station assigned wireless terminal identifier=11111 480 and a wtOnMask=010 482 and second state transition message to a second wireless terminal including a base station assigned wireless terminal identifier=11111 484 and a wtOnMask=101 486. In a third alternative, the base station sends a first state transition message to a first wireless terminal including a base station assigned wireless terminal identifier=11111 488 and a wtOnMask=100 490 and second state transition message to a second wireless terminal including a base station assigned wireless terminal identifier=11111 492 and a wtOnMask=011 494.

In this exemplary embodiments, at one extreme the base station can assign up to 93 wireless terminals to be simultaneously in a ⅓ tone format dedicated control channel mode of operation, or at the other extreme the base station can up to 31 wireless terminals to be simultaneously in ⅓ split tone mode of operation. In between these two extremes mixtures are possible, e.g., at least some wireless terminals are simultaneously in different modes of operation, the different modes of operation including: full tone format mode, ⅓ split tone format mode, and ⅔ split tone format mode.

FIG. 4 has been illustrated for an exemplary embodiment including three On state modes: full tone format, ⅓ split tone format, and ⅔ split tone format. Other embodiments may support different modes and/or different numbers of On state modes. For example, one exemplary embodiment may support both a full tone format mode and a ⅓ split tone format mode but not a ⅔ split tone format mode. In such an embodiment the mask could still be represented by three bits, with the mask being one of: 111, 100, 010, or 001, however, the state transition message needs only 2 bits to represent the four alternatives available for assignment.

Some embodiments use On state identifier fields and/or masks of a different size, e.g., facilitating different portioning of resources suited to the particular embodiment and/or particular recurring channel structure being utilized. For example, one embodiment may use 113 OFDM tones in an uplink block and 113 OFDM tones in a corresponding downlink block and utilize a 5 bit On state identifier field. However, another embodiment may use 339 OFDM in an uplink block and 339 OFDM tones in a corresponding downlink block and thus use a larger number of bits for the ON state field, e.g., 6 bits, since more uplink tones are available to be used for the dedicated control channel.

FIG. 5 is a drawing 500 of an exemplary recurring uplink channel structure 501 and an exemplary recurring downlink channel structure 551 of an exemplary embodiment. The recurring uplink channel structure 501 is controlled to be timing synchronized with respect to the downlink timing structure 551, e.g., to within a predetermined tolerance of a predetermined timing offset value, from the perspective of the base station transmitting downlink signals and receiving uplink signals in accordance with the recurring channel structures.

Vertical axis 502 represents uplink channel structure logical uplink tone index, while horizontal axis 504 represents OFDM symbol indexing within the recurring uplink timing structure. In one exemplary embodiment, the uplink channel structure includes a block of 113 contiguous tones. Uplink channel structure 501 includes access channel segments 506, uplink traffic channel segments 508, dedicated control channel segments 510, and other channel segments 512. Access channel segments are used by wireless terminals seeking to be admitted to use a base station attachment point and to subsequently obtain a wireless terminal On state identifier and corresponding wireless terminal On mask value. Uplink traffic channel segments 508 convey user data. For example, a uplink traffic segment is used for conveying MAC frames of user data from a wireless terminal, assigned the segment, to the base station which assigned the segment. Dedicated control channel segments 510 are used by wireless terminals to communicate various uplink reports, e.g., uplink traffic channel request reports, interference reports, SNR reports, power availability reports, noise reports, etc. A particular dedicated control channel segments is associated with a particular base assigned wireless terminal identifier and a bit of the mask value.

Vertical axis 552 represents downlink channel structure logical downlink tone index, while horizontal axis 554 represents OFDM symbol indexing within the recurring downlink timing structure. In one exemplary embodiment, the downlink channel structure includes a block of 113 contiguous tones. Downlink channel structure 551 includes broadcast channel segments 556, traffic control channel segments 558, downlink traffic channel segments 560, power control channel segments 562, and other channel segments 564. The broadcast channel segments 556, sometimes referred to as strip symbol segments, include, e.g., beacon signals, wideband synchronization signals, and other broadcast channel signals, e.g., other broadcast signals conveying base station configuration information. Traffic control channel segments 558 include, e.g., segments conveying uplink and/or downlink traffic channel assignments signals. Downlink traffic channels segments 560 convey user data. For example, a downlink traffic segment is used for conveying MAC frames of user data from the base station to a wireless terminal assigned the segment. Power control channel segments 562 convey wireless terminal uplink power control commands. For example, an individual power control segment is, in one embodiment, a single OFDM tone symbol representing the air link resources of one tone for one OFDM symbol transmission time period, the tone-symbol conveying a modulation symbol value directed to a single wireless terminal to control the wireless terminals transmission power level. A particular power control segment is associated with a particular base station assigned wireless terminal identifier and a bit of a mask value. Other channel segments 564 include, e.g. state transition channel segments, used to convey state transition messages.

FIG. 6 is a drawing 600 illustrating an exemplary dedicated control channel segments of a recurring structure. The exemplary dedicated control channel segments of drawing 600 may be the dedicated control channel segments 510 of uplink channel structure 501 of FIG. 5. Vertical axis 602 represents logical uplink tone index for the dedicated control channel while the horizontal axis 604 represents OFDM symbol indexing within a recurring uplink timing structure. In this example, each dedicated control channel segment uses one logical uplink tone for a plurality of OFDM symbol transmission time periods. In this exemplary embodiment, there are 31 logical channel uplink tones used by the dedicated control channel (tone with index=81 606 which corresponds to base station assigned wireless terminal On state identifier=00001, tone with index=82 608 which corresponds to base station assigned wireless terminal ON state identifier=00010, tone with index=83 609 which corresponds to base station assigned wireless terminal ON state identifier=00011 . . . , tone with index=111 which corresponds to base station assigned wireless terminal ON state identifier=11111. First vertical column 612 identifies a first set of 31 dedicated control channel indexed segments in the recurring structure, one segment associated with each of the 31 tones being used by the dedicated control channel. Similarly, vertical columns (614, 616, 618, 620, 622, 624, 626, 628) identify additional sets of indexed segments in the recurring channel structure. In this example, each dedicated control channel segment is identified by seg[i][j], where i is an integer in the range 1 . . . 31 and j is an integer in the range 0 . . . 8. The value of i identifies a dedicated control channel tone and base station assigned wireless terminal ON state identifier, the j value identifies a relative time position within the recurring timing structure. Also in FIG. 6 in each box representing a dedicated control channel segment, there is a three bit pattern identifying wireless terminal On state mask bit which corresponds to the segment. In this example, segments of columns 612, 618, and 624 are associated with bit mask pattern XX1; segments of columns 614, 620, and 626 are associated with bit mask pattern X1X; segments of columns 616, 622, and 628 are associated with bit mask pattern 1XX.

For example exemplary dedicated control channel segment [3][0] 630 corresponds to logical uplink tone 83, base station assigned wireless terminal On state identifier=00011 and corresponds to wt On mask setting XX1, where X represents a don't care condition. Thus a wireless terminal which is assigned base station ON state identifier=00011 and a corresponding mask value equal to any one of: 111, 001, 011, and 101 is the wireless terminal which is currently allocated to use the dedicated control channel segment. Continuing with the example exemplary dedicated control channel segment [3I] [1] 632 corresponds to logical uplink tone 111, base station assigned wireless terminal identifier=11111 and corresponds to wt On mask setting X1X. Thus a wireless terminal which is assigned base station ON state identifier=11111 and a mask equal to any one of: 111, 010, 011, and 110 is the wireless terminal which is currently allocated to use the dedicated control channel segment. Continuing with the example exemplary dedicated control channel segment [1][2] 634 corresponds to logical uplink tone 81, base station assigned wireless terminal identifier=00001 and corresponds to wt On mask setting 1XX. Thus a wireless terminal which is assigned base station ON state identifier=00001 and a mask equal to any one of: 111, 100, 110, and 101 is the wireless terminal which is currently allocated to use the dedicated control channel segment. For each given dedicated control channel segment at most one wireless terminal is allocated the segment in accordance with the predetermined channel structure information, known to both the base station and wireless terminals, and the base station assignment of a wireless terminal identifier and wtOnMask, e.g., in a previous state transition message.

FIG. 7 is a drawing 700 illustrating a block of exemplary power control segments 701 in an exemplary downlink recurring channel structure. Exemplary power control segments of block 701 may be included as part of power control channel segments 562 of FIG. 5. Vertical axis 702 represents logical downlink tone index for power control channel segments, while horizontal axis 704 represents OFDM symbol indexing within a recurring downlink timing structure. In this exemplary embodiment, an individual power control segment occupies the air link resources of one tone-symbol. Row 706 identifies downlink logical tone with tone index=100; row 708 identifies downlink logical tone with tone index 101; row 710 identifies downlink logical tone with tone index 102. Each of the power control segments of FIG. 7 is identified by a predetermined association with a base station assigned wireless terminal On state identifier and a mask pattern. Row 706 identifies that tone 100 is sequentially associated with (base station assigned wireless terminal On state identifier, and mask pattern): ((1,XX1), (4, XX1), (7, XX1), (10, XX1), (13, XX1), (16, XX1), (19, XX1), (22, XX1), (25, XX1), (28, XX1), (31, XX1), (3, X1X), (6, X1X), (9, X1X), (12, X1X), (15, X1X), (18, X1X), (21, X1X), (24, X1X), (27, X1X), (30, X1X), (2, 1XX), (5, 1XX), (8, 1XX), (11, 1XX), (14, 1XX), (17, 1XX), (20, 1XX), (23, 1XX), (26, 1XX), (29, 1XX). Row 708 identifies that tone 101 is sequentially associated with (base station assigned wireless terminal On state identifier, and mask pattern): ((2,XX1), (5, XX1), (8, XX1), (11, XX1), (14, XX1), (17, XX1), (20, XX1), (23, XX1), (26, XX1), (29, XX1), (1, X1X), (4, X1X), (7, X1X), (10, X1X), (13, X1X), (16, X1X), (19, X1X), (22, X1X), (25, X1X), (28, X1X), (31, X1X), (3, 1XX), (6, 1XX), (9, 1XX), (12, 1XX), (15, 1XX), (18, 1XX), (21, 1XX), (24, 1XX), (27, 1XX), (30, 1XX). Row 710 identifies that tone 102 is sequentially associated with (base station assigned wireless terminal On state identifier, and mask pattern): ((3,XX1), (6, XX1), (9, XX1), (12, XX1), (15, XX1), (18, XX1), (21, XX1), (24, XX1), (27, XX1), (30, XX1), (2, X1X), (5, X1X), (8, X1X), (11, X1X), (14, X1X), (17, X1X), (20, X1X), (23, X1X), (26, X1X), (29, X1X), (1, 1XX), (4, 1XX), (7, 1XX), (10, 1XX), (13, 1XX), (16, 1XX), (19, 1XX), (22, 1XX), (25, 1XX), (28, 1XX), (31, 1XX).

As an example consider the power control segment 712. The base station sends a power control command using that segment, e.g., tone-symbol, directed to the wireless terminal which is currently assigned wireless terminal On state identifier 21 (10101) and has been assigned a corresponding mask which matches X1X, e.g., the mask is one of 111, 010, 110, or 011. In this exemplary embodiment, at most one wireless terminal using the base station attachment point can satisfy this condition.

FIG. 8 is a drawing 800 including an exemplary recurring downlink traffic channel structure 801. Exemplary downlink traffic channel structure 801 may be the exemplary downlink traffic channel segments 560 of FIG. 5. Exemplary downlink traffic channel structure 801 includes 8 indexed downlink traffic channel segments (downlink traffic channel sent 0 806, downlink traffic channel segment 1 810, downlink traffic channel segment 2 810, downlink traffic channel segment 3 812, downlink traffic channel segment 4 814, downlink traffic channel segment 5 816, downlink traffic channel segment 6 818, downlink traffic channel segment 7 820, downlink traffic channel segment 8 822). Vertical axis 802 represents logical downlink tone index for the downlink traffic channel segments while horizontal axis 804 indicates OFDM symbol indexing with the recurring downlink timing structure. In this exemplary embodiment each traffic channel segment includes a plurality of tones for a plurality of OFDM symbol transmission time periods.

In this exemplary downlink traffic channel structure, downlink traffic channel segment 0 806 can be assigned to a wireless terminal having an On state mask value of XX1, where X represents a don't care condition. Thus a wireless terminal with an On state mask of 111, 001, 101, or 011 can be assigned DL TCH segment 0 806, while a wireless terminal with On state masks of 100, 010, or 110 cannot be assigned segment 806. Downlink traffic channel segment 3 812 can be assigned to a wireless terminal having an On state mask value of X1X; downlink traffic channel segment 6 818 can be assigned to a wireless terminal having an On state mask value of 1XX.

In this exemplary downlink traffic channel structure, downlink traffic channel segment 1 808 can be assigned to a wireless terminal having an On state mask value of X1X or 1XX, where X represents a don't care condition. Thus segment 808 can be assigned to a wireless terminal having an On state mask of 111, 100, 010, 110, 101, or 011, but cannot be assigned to a wireless terminal having an On state mask of 001. In addition, in this exemplary structure, the assignment information corresponding to downlink traffic channel segment 1 808 includes a bit mask identifier, e.g., a single bit, used to distinguish between the first potential bit mask pattern, X1X, that can be associated with the assignment of the segment and the second potential bit mask pattern, 1XX, that can be associated with the segment. For example, if the base station decides that segment 808 is to be assigned to a wireless terminal with bit mask=010, the base station sets the bit mask identifier in the corresponding assignment information to 0, while if the base station decides that segment 808 is to be assigned to a wireless terminal with bit mask=100, the base station sets the bit mask identifier in the corresponding assignment information to 1.

Downlink traffic channel segment 2 810 can be assigned to a wireless terminal having an On state mask value of XX1 or X1X. Downlink traffic channel segment 4 814 can be assigned to a wireless terminal having an On state mask value of XX1 or 1XX. Downlink traffic channel segment 5 816 can be assigned to a wireless terminal having an On state mask value of X1X or 1XX. Downlink traffic channel segment 7

820 can be assigned to a wireless terminal having an On state mask value of XX1 or X1X. Downlink traffic channel segment 8 822 can be assigned to a wireless terminal having an On state mask value of 1XX or XX1.

In this exemplary embodiment, it may be observed that a wireless terminal in a full-tone format mode of ON state operation, having an ON state mask=111, can be potentially assigned any of the 9 downlink traffic channel segments. A wireless terminal in ⅓ split tone format mode of ON state operation, having an On state mask equal to one of 001, 010 and 100, can be potentially assigned any of 5 downlink traffic channel segments. For example, a wireless terminal with an On state mask=001 can be assigned any of segments 0, 2, 4, 7, and 8. A wireless terminal in ⅔ split tone format mode of On state operation, having an On state mask equal to one of 110, 101 and 011, can potentially be assigned any of 8 downlink traffic channel segments. For example, a wireless terminal with an On state mask=110 can be assigned any of segments 1, 2, 3, 4, 5, 6, 7, and 8.

FIG. 9 is a drawing 900 including an exemplary recurring uplink traffic channel structure 901. Exemplary uplink traffic channel structure 901 may be the exemplary uplink traffic channel segments 508 of FIG. 5. Exemplary uplink traffic channel structure 901 includes 8 indexed uplink traffic channel segments (uplink traffic channel segment 0 906, uplink traffic channel segment 1 908, uplink traffic channel segment 2 910, uplink traffic channel segment 3 912, uplink traffic channel segment 4 914, uplink traffic channel segment 5 916, uplink traffic channel segment 6 918, uplink traffic channel segment 7 920, uplink traffic channel segment 8 922). Vertical axis 902 represents logical uplink tone index for the uplink traffic channel segments while horizontal axis 904 indicates OFDM symbol indexing with the recurring uplink timing structure. In this exemplary embodiment each traffic channel segment includes a plurality of tones for a plurality of OFDM symbol transmission time periods.

In this exemplary uplink traffic channel structure, uplink traffic channel segment 0 906 can be assigned to a wireless terminal having an On state mask value of XX1, where X represents a don't care condition. Thus a wireless terminal with an On state mask of 111, 001, 101, or 011 can be assigned UL TCH segment 0 906, while a wireless terminal with On state masks of 100, 010, or 110 cannot be assigned segment 906. Uplink traffic channel segment 3 912 can be assigned to a wireless terminal having an On state mask value of X1X; uplink traffic channel segment 6 918 can be assigned to a wireless terminal having an On state mask value of 1XX.

In this exemplary uplink traffic channel structure, uplink traffic channel segment 1 908 can be assigned to a wireless terminal having an On state mask value of X1X or 1XX, where X represents a don't care condition. Thus segment 908 can be assigned to a wireless terminal having an On state mask of 111, 100, 010, 110, 101, or 011, but cannot be assigned to a wireless terminal having an On state mask of 001. In addition, in this exemplary structure, the assignment information corresponding to uplink traffic channel segment 1 908 includes a bit mask identifier, e.g., a single bit, used to distinguish between the first potential bit mask pattern, X1X, that can be associated with the assignment of the segment and the second potential bit mask pattern, 1XX, that can be associated with the segment. For example, if the base station decides that segment 908 is to be assigned to a wireless terminal with bit mask=010, the base station sets the bit mask identifier in the corresponding assignment information to 0, while if the base station decides that segment 908 is to be assigned to a wireless terminal with bit mask=100, the base station sets the bit mask identifier in the corresponding assignment information to 1.

Uplink traffic channel segment 2 910 can be assigned to a wireless terminal having an On state mask value of XX1 or X1X. Uplink traffic channel segment 4 914 can be assigned to a wireless terminal having an On state mask value of XX1 or 1XX. Uplink traffic channel segment 5 916 can be assigned to a wireless terminal having an On state mask value of X1X or 1XX. Uplink traffic channel segment 7 920 can be assigned to a wireless terminal having an On state mask value of XX1 or X1X. Uplink traffic channel segment 8 922 can be assigned to a wireless terminal having an On state mask value of 1XX or XX1.

In this exemplary embodiment, it may be observed that a wireless terminal in a full-tone format mode of ON state operation, having an ON state mask=111, can be potentially assigned any of the 9 uplink traffic channel segments. A wireless terminal in ⅓ split tone format mode of ON state operation, having an On state mask equal to one of 001, 010 and 100, can be potentially assigned any of 5 uplink traffic channel segments. For example, a wireless terminal with an On state mask=001 can be assigned any of segments 0, 2, 4, 7, and 8. A wireless terminal in ⅔ split tone format mode of On state operation, having an On state mask equal to one of 110, 101 and 011, can potentially be assigned any of 8 uplink traffic channel segments. For example, a wireless terminal with an On state mask=011 can be assigned any of segments 0, 1, 2, 3, 4, 5, 7, and 8.

FIG. 10 is a drawing 1000 illustrating exemplary state transition message signaling conveying base station assigned wireless terminal identifiers and corresponding masks to a plurality of wireless terminals. Drawing 1000 includes exemplary base station 1002 and exemplary wireless terminals (wireless terminal A 1004, wireless terminal B 1006, wireless terminal C 1008, wireless terminal D 1010, wireless terminal E 1012, wireless terminal F 1014). Base station 1002 may exemplary base station 200 of FIG. 2, while a wireless terminal (1004, 1006, 1008, 1010, 1012, 1014) may be a wireless terminal 300 of FIG. 3.

Base station 1002 allocates resources, e.g., air link resources, to WT A 1004 and transmits a state transition message 1614 to wireless terminal A 1004. State transition message 1614 includes a wireless terminal On identifier field communicating a 5 bit identifier of 00001 (1) 1616, and a wireless terminal On mask field communicating a bit pattern 111 1618. Wireless terminal A 1004 receives state transition message 1614, processes the message recovering the information communicated, and stores its base station assigned wireless terminal On state identifier=00001 (1) and corresponding wireless terminal On mask=111. WT A 1004 recognizes that it has been transitioned in a $1^{st}$ mode of On state operation, full tone format DCCH mode. WT A 1004 identifies resources that it has been allocated, e.g., uplink dedicated control channel segments and downlink wireless terminal transmission power control segments.

Base station 1002 allocates resources to WT B 1006 and transmits a state transition message 1620 to wireless terminal B 1006. State transition message 1620 includes a wireless terminal On identifier field communicating a 5 bit identifier of 00010 (2) 1622, and a wireless terminal On mask field communicating a bit pattern 001 1624. Wireless terminal B 1006 receives state transition message 1620, processes the message recovering the information communicated, and stores its base station assigned wireless terminal On state identifier=00010 (2) and corresponding wireless terminal On mask=001. WT B 1006 recognizes that it has been transitioned in a $2^{nd}$ mode of On state operation, ⅓ split tone format DCCH mode. WT B 1006 identifies resources that it has been allocated.

Base station 1002 allocates resources to WT C 1008 and transmits a state transition message 1626 to wireless terminal C 1008. State transition message 1626 includes a wireless terminal On identifier field communicating a 5 bit identifier of 00010 (2) 1628, and a wireless terminal On mask field communicating a bit pattern 010 1630. Wireless terminal C 1008 receives state transition message 1626, processes the message recovering the information communicated, and stores its base station assigned wireless terminal On state identifier=00010 (2) and corresponding wireless terminal On mask=010. WT C 1008 recognizes that it has been transitioned in a $2^{nd}$ mode of On state operation, ⅓ split tone format DCCH mode. WT C 1008 identifies resources that it has been allocated.

Base station 1002 allocates resources to WT D 1010 and transmits a state transition message 1632 to wireless terminal D 1010. State transition message 1632 includes a wireless terminal On identifier field communicating a 5 bit identifier of 00010 (2) 1634, and a wireless terminal On mask field communicating a bit pattern 100 1636. Wireless terminal D 1010 receives state transition message 1632, processes the message recovering the information communicated, and stores its base station assigned wireless terminal On state identifier=00010 (2) and corresponding wireless terminal On mask=100. WT D 1010 recognizes that it has been transitioned in a $2^{nd}$ mode of On state operation, ⅓ split tone format DCCH mode. WT D 1010 identifies resources that it has been allocated.

Base station 1002 allocates resources to WT E 1012 and transmits a state transition message 1638 to wireless terminal E 1012. State transition message 1638 includes a wireless terminal On identifier field communicating a 5 bit identifier of 00011 (3) 1640, and a wireless terminal On mask field communicating a bit pattern 011 1642. Wireless terminal E 1012 receives state transition message 1638, processes the message recovering the information communicated, and stores its base station assigned wireless terminal On state identifier=00011 (3) and corresponding wireless terminal On mask=011. WT E 1012 recognizes that it has been transitioned in a $3^{rd}$ mode of On state operation, ⅔ split tone format DCCH mode. WT E 1012 identifies resources that it has been allocated.

Base station 1002 allocates resources to WT F 1014 and transmits a state transition message 1644 to wireless terminal F 1014. State transition message 1644 includes a wireless terminal On identifier field communicating a 5 bit identifier of 00011 (3) 1646, and a wireless terminal On mask field communicating a bit pattern 100 1648. Wireless terminal F 1014 receives state transition message 1644, processes the message recovering the information communicated, and stores its base station assigned wireless terminal On state identifier=00011 (3) and corresponding wireless terminal On mask=100. WT F 1014 recognizes that it has been transitioned in a $2^{nd}$ mode of On state operation, ⅓ split tone format DCCH mode. WT F 1014 identifies resources that it has been allocated.

Figure 11:
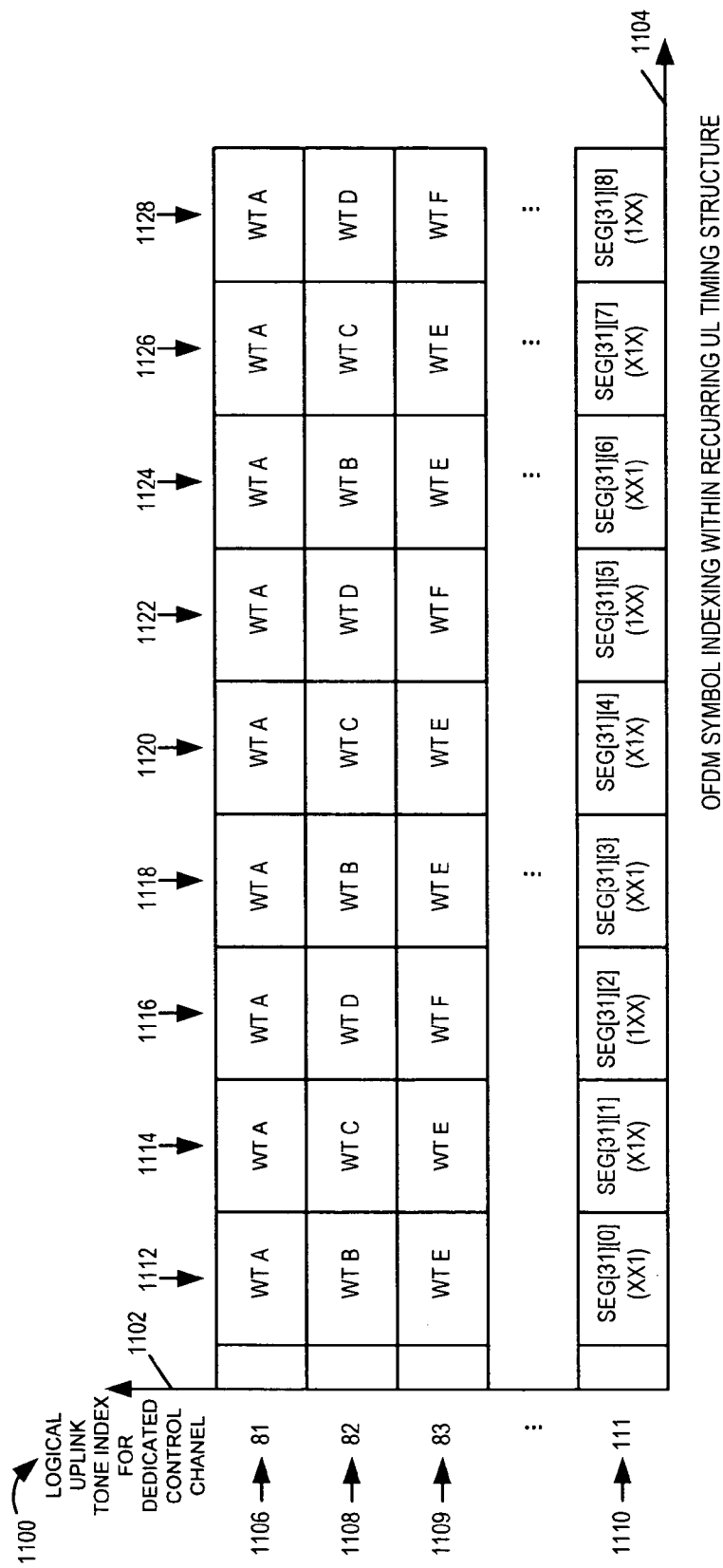
FIG. 11 is a drawing identifying dedicated control channel resources allocated to WTs in accordance with the exemplary state transition message signaling of FIG. 10.

FIG. 11 is a drawing 1100 identifying dedicated control channel resources allocated to WTs in accordance with the exemplary state transition message signaling of FIG. 10. The dedicated control channel structure of FIG. 11 may correspond to the exemplary structure of FIG. 6. Vertical axis 1102 represents logical uplink tone index for the dedicated control channel while the horizontal axis 1104 represents OFDM symbol indexing within a recurring uplink timing structure. In this example, each dedicated control channel segment uses one logical uplink tone for a plurality of OFDM symbol transmission time periods. In this exemplary embodiment, there are 31 logical channel uplink tones used by the dedicated control channel (tone with index=81 1106 which corresponds to base station assigned wireless terminal On state identifier=00001 (1), tone with index=82 1108 which corresponds to base station assigned wireless terminal ON state identifier=00010 (2), tone with index=83 1109 which corresponds to base station assigned wireless terminal ON state identifier=00011 (3) . . . , tone with index=111 which corresponds to base station assigned wireless terminal ON state identifier=11111 (31)). First vertical column 1112 identifies a first set of 31 dedicated control channel indexed segments in the recurring structure, one segment associated with each of the 31 tones being used by the dedicated control channel. Similarly, vertical columns (1114, 1116, 1118, 1120, 1122, 1124, 1126, 1128) identify additional sets of indexed segments in the recurring channel structure. Corresponding to logical uplink tone 81 1106, the nine dedicated control channel segments are allocated to WT A. Corresponding to logical uplink tone 82 1108, the nine indexed dedicated control channel segments are allocated to (WT B, WT C, WT D, WT B, WT C, WT D, WT B, WT C, WT D), respectively. Corresponding to logical uplink tone 83 1109, the nine indexed dedicated control channel segments are allocated to (WT E, WT E, WT F, WT E, WT E, WT F, WT E, WT E, WT F), respectively.

Figure 12:
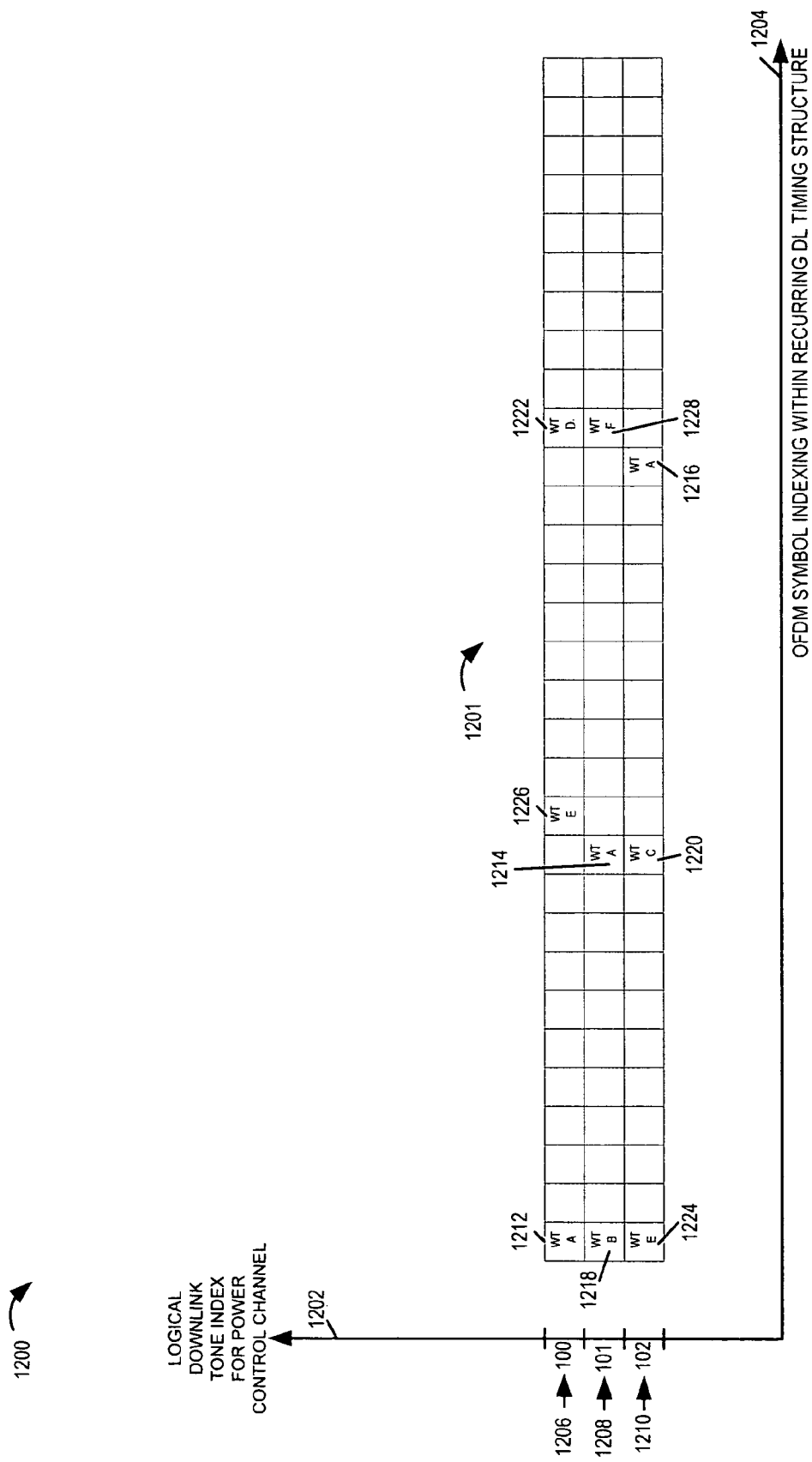
FIG. 12 is a drawing identifying downlink power control channel resources allocated to WTs in accordance with the exemplary state transition message signaling of FIG. 10.

FIG. 12 is a drawing 1200 identifying downlink power control channel resources allocated to WTs in accordance with the exemplary state transition message signaling of FIG. 10. The dedicated control channel structure of FIG. 12 may correspond to the exemplary structure of FIG. 7. Drawing 1200 includes a block of exemplary power control segments 1201 in an exemplary downlink recurring channel structure. Vertical axis 1202 represents logical downlink tone index for power control channel segments, while horizontal axis 1204 represents OFDM symbol indexing within a recurring downlink timing structure. In this exemplary embodiment, an individual power control segment occupies the air link resources of one tone-symbol. Row 1206 identifies downlink logical tone with tone index=100; row 1208 identifies downlink logical tone with tone index 101; row 1210 identifies downlink logical tone with tone index 102. Segment (1212, 1214, 1216) of row (1206, 1208, 1210), respectively, is allocated to wireless terminal A 1004. Segment 1218 of row 1208 is allocated to wireless terminal B 1006. Segment 1220 of row 1210 is allocated to wireless terminal C 1008. Segment 1222 of row 1216 is allocated to wireless terminal D 1010. Segment (1224, 1226) of row (1210, 1206), respectively, is allocated to wireless terminal E 1012. Segment 1228 of row 1208 is allocated to wireless terminal F 1014.

FIG. 13 is a drawing 1300 illustrates exemplary assignment and assignment information signaling corresponding to uplink traffic channel segments. The exemplary uplink traffic channel structure described with respect to FIG. 9 may be the uplink structure in use by base station 1002 and wireless terminals 1004, 1006, 1008, 1010, 1012, 1014 with respect to FIG. 13.

Base station 1002 decides to assign uplink traffic channel segment 0 906 to wireless terminal A 1004, generates an assignment and broadcasts an assignment signal 1302. Assignment signal 1302 includes wireless terminal On state identifier=00001 which identifies WT A 1004 as the intended recipient of the assignment. Base station 1002 decides to assign uplink traffic channel segment 1 908 to wireless terminal C 1008, generates an assignment and broadcasts an assignment signal 1304. Assignment signal 1304 includes wireless terminal On state identifier=00010 and a mask identifier=0 which, in combination, identify WT C 1008 as the intended recipient of the assignment. Base station 1002 decides to assign uplink traffic channel segment 2 910 to wireless terminal B 1006, generates an assignment and broadcasts an assignment signal 1306. Assignment signal 1306 includes wireless terminal On state identifier=00010 and a mask identifier=0 which identifies WT B 1006 as the intended recipient of the assignment.

Base station 1002 decides to assign uplink traffic channel segment 3 912 to wireless terminal E 1012, generates an assignment and broadcasts an assignment signal 1308. Assignment signal 1308 includes wireless terminal On state identifier=00011 which identifies WT E 1012 as the intended recipient of the assignment. Base station 1002 decides to assign uplink traffic channel segment 4 914 to wireless terminal F 1014, generates an assignment and broadcasts an assignment signal 1310. Assignment signal 1310 includes wireless terminal On state identifier=00011 and a mask identifier=1 which, in combination, identify WT F 1014 as the intended recipient of the assignment.

Base station 1002 decides to assign uplink traffic channel segment 5 916 to wireless terminal A 1004, generates an assignment and broadcasts an assignment signal 1312. Assignment signal 1312 includes wireless terminal On state identifier=00001 and a mask identifier=X, where X is a don't care condition. In this exemplary assignment the wireless terminal On state identifier communicated in the assignment is sufficient to convey the assignment and identify WT A 1004 as the intended recipient of the assignment since other wireless terminals do not share the base station assigned On state identifier with respect to the base station attachment point.

Base station 1002 decides to assign uplink traffic channel segment 6 918 to wireless terminal D 1010, generates an assignment and broadcasts an assignment signal 1314. Assignment signal 1314 includes wireless terminal On state identifier=00010 which identifies WT D 1010 as the intended recipient of the assignment. Base station 1002 decides to assign uplink traffic channel segment 7 920 to wireless terminal A 1004, generates an assignment and broadcasts an assignment signal 1316. Assignment signal 1316 includes wireless terminal On state identifier=00001 and a mask identifier=X. In this exemplary assignment the wireless terminal On state identifier communicated in the assignment is sufficient to convey the assignment, and identify WT A 1004 as the intended recipient of the assignment since other wireless terminals do not share the base station assigned On state identifier with respect to the base station attachment point.

Base station 1002 decides to assign uplink traffic channel segment 8 922 to wireless terminal E 1012, generates an assignment and broadcasts an assignment signal 1318. Assignment signal 1318 includes wireless terminal On state identifier=00011 and a mask identifier=1, which in combination, identify WT E 1012 as the intended recipient of the assignment.

Dashed line arrows 1320 are used to identify the wireless terminal to which an assignment is intended. WT A receives and processes assignment signals, recognizing that it has been allocated uplink traffic channel segments 0, 5 and 7. WT B receives and processes assignment signals, recognizing that it has been allocated uplink traffic channel segment 2. WT C receives and processes assignment signals, recognizing that it has been assigned uplink traffic channel segment 1. WT D receives and processes assignment signals recognizing that it has been assigned uplink traffic channel segment 6. WT E receives and processes assignment signals recognizing that it has been assigned uplink traffic channel segments 3 and 8. WT F receives and processes assignment signals recognizing that it has been assigned uplink traffic channel segment 4.

FIG. 14 is a drawing 1400 illustrates exemplary assignment and assignment information signaling corresponding to downlink traffic channel segments. The exemplary downlink traffic channel structure described with respect to FIG. 8 may be the downlink structure in use by base station 1002 and wireless terminals 1004, 1006, 1008, 1010, 1012, 1014 with respect to FIG. 14.

Base station 1002 decides to assign downlink traffic channel segment 0 806 to wireless terminal E 1012, generates an assignment and broadcasts an assignment signal 1402. Assignment signal 1402 includes wireless terminal On state identifier=00011 which identifies WT E 1012 as the intended recipient of the assignment. Base station 1002 decides to assign downlink traffic channel segment 1 808 to wireless terminal A 1004, generates an assignment and broadcasts an assignment signal 1404. Assignment signal 1404 includes wireless terminal On state identifier=00001 and a mask identifier=X. For this particular assignment, the wireless terminal On state identifier is sufficient to identify WT A as the intended recipient of the assignment, since WT A does not share its base station assigned wireless terminal On state identifier with other wireless terminals with respect to the base station attachment point. Base station 1002 decides to assign downlink traffic channel segment 2 810 to wireless terminal A 1004, generates an assignment and broadcasts an assignment signal 1406. Assignment signal 1406 includes wireless terminal On state identifier=00001 and a mask identifier=X. For this particular assignment, the wireless terminal On state identifier is sufficient to identify WT A as the intended recipient of the assignment, since WT A does not share its base station assigned wireless terminal On state identifier with other wireless terminals with respect to the base station attachment point.

Base station 1002 decides to assign downlink traffic channel segment 3 812 to wireless terminal A 1002, generates an assignment and broadcasts an assignment signal 1408. Assignment signal 1408 includes wireless terminal On state identifier=00001 which identifies WT A 1002 as the intended recipient of the assignment. Base station 1002 decides to assign downlink traffic channel segment 4 814 to wireless terminal B 1006, generates an assignment and broadcasts an assignment signal 1410. Assignment signal 1410 includes wireless terminal On state identifier=00010 and a mask identifier=0 which, in combination, identify WT B 1006 as the intended recipient of the assignment.

Base station 1002 decides to assign downlink traffic channel segment 5 816 to wireless terminal E 1012, generates an assignment and broadcasts an assignment signal 1412. Assignment signal 1412 includes wireless terminal On state identifier=00011 and a mask identifier=0, which, in combination, identify WT E 1012 as the intended recipient of the assignment.

Base station 1002 decides to assign downlink traffic channel segment 6 818 to wireless terminal F 1014, generates an assignment and broadcasts an assignment signal 1414. Assignment signal 1414 includes wireless terminal On state identifier=00011 which identifies WT F 1014 as the intended recipient of the assignment. Base station 1002 decides to assign downlink traffic channel segment 7 820 to wireless terminal C 1004, generates an assignment and broadcasts an assignment signal 1416. Assignment signal 1416 includes wireless terminal On state identifier=00010 and a mask identifier=1 which, in combination, identify WT C 1008 as the intended recipient of the assignment. Base station 1002 decides to assign downlink traffic channel segment 8 822 to wireless terminal D 1010, generates an assignment and broadcasts an assignment signal 1418. Assignment signal 1418 includes wireless terminal On state identifier=00010 and a mask identifier=0, which in combination, identify WTD 1010 as the intended recipient of the assignment.

Dashed line arrows 1420 are used to identify the wireless terminal to which an assignment is intended. WT A receives and processes assignment signals, recognizing that it has been allocated downlink traffic channel segments 1, 2 and 3. WT B receives and processes assignment signals, recognizing that it has been allocated downlink traffic channel segment 4. WT C receives and processes assignment signals, recognizing that it has been assigned downlink traffic channel segment 7. WT D receives and processes assignment signals recognizing that it has been assigned downlink traffic channel segment 8. WT E receives and processes assignment signals recognizing that it has been assigned downlink traffic channel segments 0 and 5. WT F receives and processes assignment signals recognizing that it has been assigned downlink traffic channel segment 6.

In this exemplary embodiment, each assignment for a corresponding traffic channel segment is transmitted at a predetermined position within the downlink timing structure; the predetermined position and relationship with respect to the traffic channel segment being known to both the base station and the wireless terminal. Thus, information bits need not be used to identify the index of the traffic segment in the assignment signal. In some embodiments, for some traffic channel segment assignments, multiple traffic channel assignments are communicated in the same traffic control channel message signal, e.g., with each of the multiple included assignments having a predetermined slot position within the traffic control channel signal.

Figure 15:
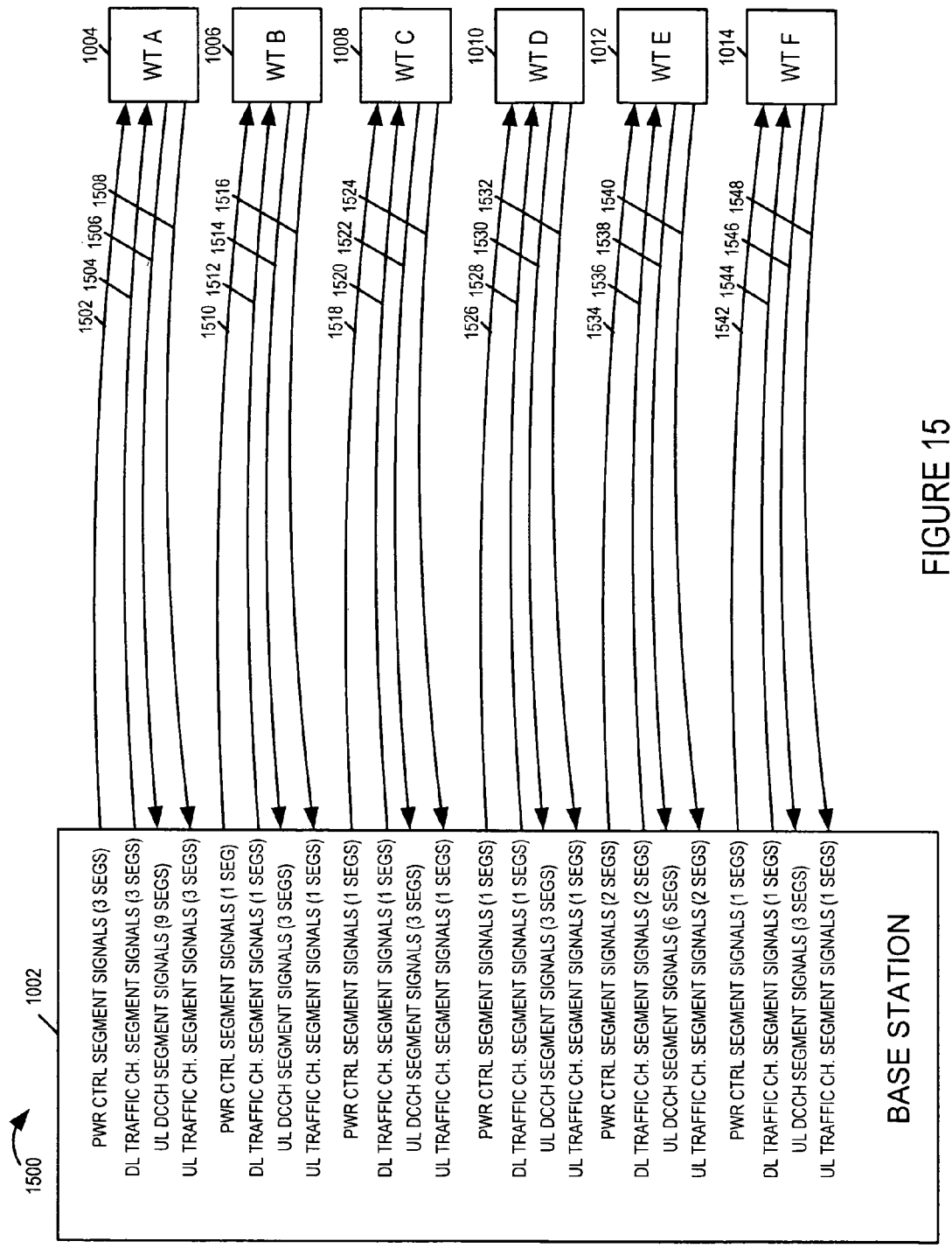
FIG. 15 is a drawing illustrating exemplary signaling between base station and wireless terminals in view of the exemplary wireless terminal state transition messages of FIG. 10 and the exemplary traffic channel assignments of FIGS. 13 and 14.

FIG. 15 is a drawing 1500 illustrating exemplary signaling between base station 1002 and WTs (WT A 1004, WT B 1006, WT C 1008, WT D 1010, WT E 1012, WT F 1014) in view of the exemplary wireless terminal state transition messages of FIG. 10 and the exemplary traffic channel assignments of FIGS. 13 and 14. Arrow 1502 represents downlink power control signals transmitted from base station 1002 to wireless terminal A 1004 using the three allocated segments (1212, 1214, 1216) of FIG. 12. Arrow 1504 represents downlink traffic channel segment signals transmitted from base station 1002 to wireless terminal A 1004 using the three allocated downlink traffic channel segments (segments 1, 2, and 3). Arrow 1506 represents uplink dedicated control channel segment signals transmitted from WT A 1004 to base station 1002 using the nine dedicated control channel segments allocated to WT A 1004 of FIG. 11 corresponding to logical uplink tone 81. Arrow 1508 represent uplink traffic channel segment signals transmitted from WT A 1004 to base station 1002 using the three uplink traffic channel segments (segment 0, segment 5, segment 7) allocated to WT A 1004.

Arrow 1510 represents downlink power control signals transmitted from base station 1002 to wireless terminal B 1006 using the one allocated segment (segment 1218) of FIG. 12. Arrow 1512 represents downlink traffic channel segment signals transmitted from base station 1002 to wireless terminal B 1006 using the one allocated downlink traffic channel segments (segment 4). Arrow 1514 represents uplink dedicated control channel segment signals transmitted from WT B 1006 to base station 1002 using the three dedicated control channel segments allocated to WT B 1006 of FIG. 11 corresponding to logical uplink tone 82. Arrow 1516 represent uplink traffic channel segment signals transmitted from WT B 1006 to base station 1002 using the one uplink traffic channel segments (segment 2) allocated to WT B 1006.

Arrow 1518 represents downlink power control signals transmitted from base station 1002 to wireless terminal C 1008 using the one allocated segments (segment 1220) of FIG. 12. Arrow 1520 represents downlink traffic channel segment signals transmitted from base station 1002 to wireless terminal C 1008 using the one allocated downlink traffic channel segments (segment 7). Arrow 1522 represents uplink dedicated control channel segment signals transmitted from WT C 1008 to base station 1002 using the three dedicated control channel segments allocated to WT C 1008 of FIG. 11 corresponding to logical uplink tone 82. Arrow 1524 represent uplink traffic channel segment signals transmitted from WT C 1008 to base station 1002 using the one uplink traffic channel segments (segment 1) allocated to WT C 1008.

Arrow 1526 represents downlink power control signals transmitted from base station 1002 to wireless terminal D 1010 using the one allocated segments (segment 1222) of FIG. 12. Arrow 1528 represents downlink traffic channel segment signals transmitted from base station 1002 to wireless terminal D 1010 using the one allocated downlink traffic channel segments (segment 8). Arrow 1530 represents uplink dedicated control channel segment signals transmitted from WT D 1010 to base station 1002 using the three dedicated control channel segments allocated to WT D 1008 of FIG. 11 corresponding to logical uplink tone 82. Arrow 1532 represent uplink traffic channel segment signals transmitted from WT D 1010 to base station 1002 using the one uplink traffic channel segments (segment 6) allocated to WT D 1010.

Arrow 1534 represents downlink power control signals transmitted from base station 1002 to wireless terminal E 1012 using the two allocated segments (segment 1224, segment 1226) of FIG. 12. Arrow 1536 represents downlink traffic channel segment signals transmitted from base station 1002 to wireless terminal E 1012 using the two allocated downlink traffic charnel segments (segment 0 and segment 5). Arrow 1538 represents uplink dedicated control channel segment signals transmitted from WT E 1012 to base station 1002 using the six dedicated control channel segments allocated to WT E 1012 of FIG. 11 corresponding to logical uplink tone 83. Arrow 1540 represent uplink traffic channel segment signals transmitted from WT E 1012 to base station 1002 using the two uplink traffic channel segments (segment 3 and segment 8) allocated to WT E 1012.

Arrow 1542 represents downlink power control signals transmitted from base station 1002 to wireless terminal F 1014 using the one allocated segments (segment 1228) of FIG. 12. Arrow 1544 represents downlink traffic channel segment signals transmitted from base station 1002 to wireless terminal F 1014 using the one allocated downlink traffic channel segments (segment 6). Arrow 1546 represents uplink dedicated control channel segment signals transmitted from WT F 1014 to base station 1002 using the three dedicated control channel segments allocated to WT F 1014 of FIG. 11 corresponding to logical uplink tone 83. Arrow 1548 represent uplink traffic channel segment signals transmitted from WT F 1014 to base station 1002 using the one uplink traffic channel segments (segment 4) allocated to WT F 1014.

Figure 16:
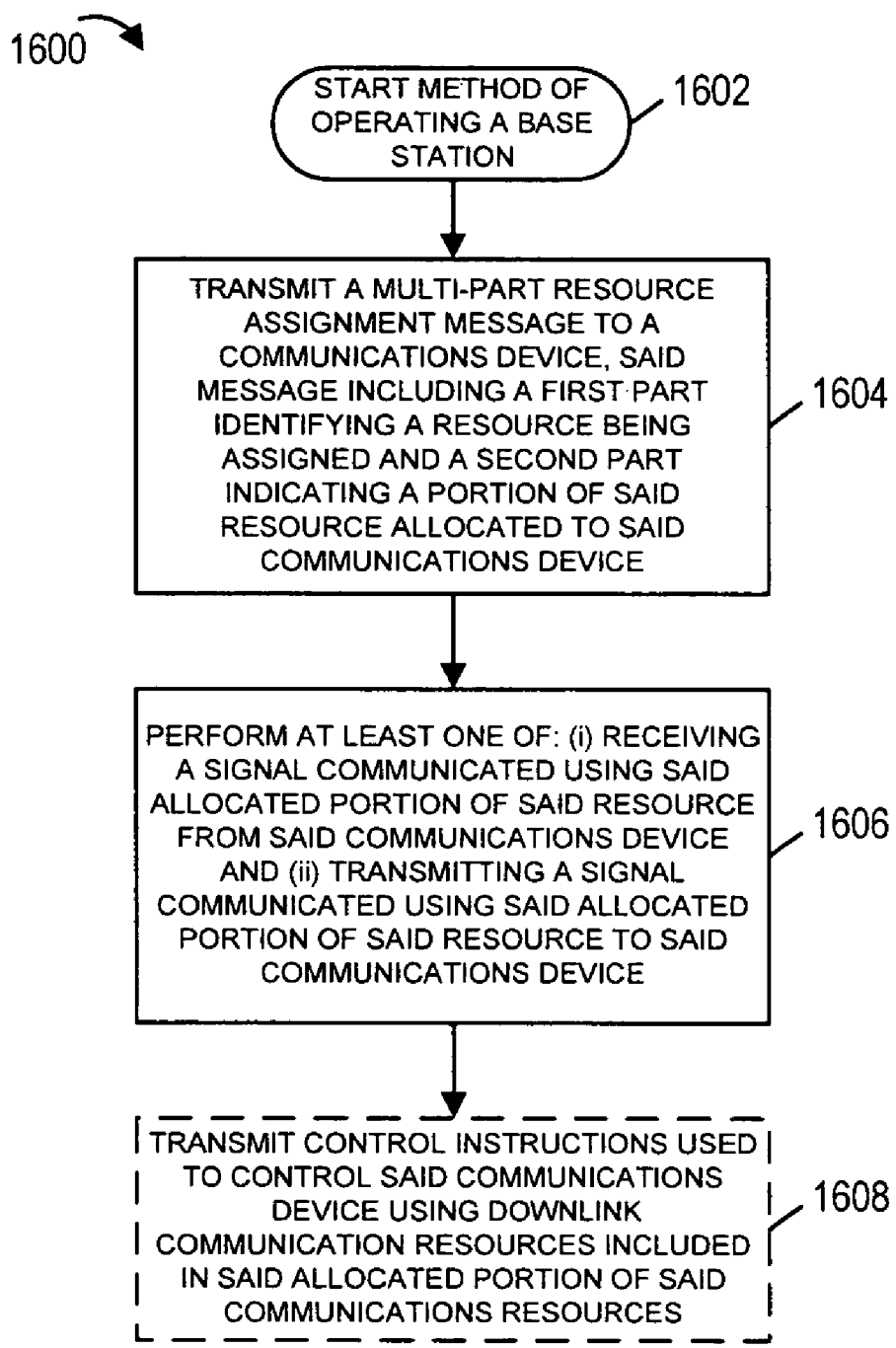
FIG. 16 is a drawing of a flowchart of an exemplary method of operating a base station in accordance with various embodiments.

FIG. 16 is a drawing of a flowchart 1600 of an exemplary method of operating a base station in accordance with various embodiments. The exemplary method starts in step 1602, where the base station is powered on and initialized. Operation proceeds from step 1602 to step 1604. In step 1604, the base station transmits a multi-part resource assignment message to a communications device, e.g., a wireless terminal such as a mobile node, said message including a first part identifying a resource being assigned and a second part indicating a portion of said resource allocated to said communications device. In some embodiments, the multi-part resource assignment message is a state transition message. The first part, in some embodiments, is a base station assigned wireless terminal ON state identifier and the second part is a base station assigned ON state mask. In some embodiments, the first part includes a first number of bits, e.g., 5 bits used to represent a wireless terminal ON state identifier in the range of 1 . . . 31, and the second part includes a second number of bits, e.g., 3 bits, used to represent the mask. In other embodiments, the 5 bits used to represent a wireless terminal On state identifier may represent 32 alternative assignments. In some such embodiments, the second part indicates a fractional portion of the resource allocated to the communications device. In some embodiments, the resource includes a set of non-overlapping fractional portions, the second part is a bit mask, and the second number of bits equals the number of non-overlapping fractional portions in said set. Operation proceeds from step 1604 to step 1606.

In some embodiment, when all the bits in the mask indicate assignment of the corresponding non-overlapping portions, the communications device is allocated the complete assigned resource. For example, in one exemplary embodiment, if the bit mask=111, this indicates that the communications device is allocated each of the segments of the dedicated control channel corresponding to a single logical dedicated control channel uplink tone.

In some embodiments, the complete assigned resource includes each of the non-overlapping fractional portions in a set and a remainder portion of said allocated resource not included in any of said non-overlapping fractional portions. For example, consider that the resource of a logical dedicated control channel tone is utilized for 10 indexed segments in a recurring channel structure. In one embodiment, the 10 segments may be divided into 3 sets of 3 each plus one remainder segment. If a wireless terminal is assigned the entire resource via mask value=111 the wireless terminal is allocated each of the 10 segments. If the wireless terminal is assigned a mask value of 001, the wireless terminal is allocated indexed segments (0, 3, 6); if the wireless terminal is assigned mask value 010, the wireless terminal is allocated indexed segments (1, 4, 7); if the wireless terminal is assigned mask value 100, the wireless terminal is allocated indexed segments (2, 5, 8).

In some embodiments, the assigned resource includes an uplink communications resource. In some embodiments, the assigned resource includes a downlink communications resource. In some embodiments, the assigned resource includes both an uplink communications resource and a downlink communications resource. In various embodiments, the assigned resource is a frequency resource. In an exemplary embodiment, the assigned resource is a single tone, e.g., a single logical tone, and the indicated portion indicates a sequence of time periods in which said tone is allocated to said communications device. For example, the single tone is, in some embodiments, a logical tone from a set of logical tones used for the dedicated control channel structure of the base station, and the portions are dedicated control channel segments using that single logical tone.

In step 1606, the base station performs at least one of: (i) receiving a signal communicated used said allocated portion of said resource from said communications device and (ii) transmitting a signal communicated using said allocated portion of said resource to said communications device. For example, if the allocated portion of the resource includes uplink dedicated control channel segments, the base station receives signals communicated using said allocated portion of the said resource from the communications device. In some such cases, the received dedicated control channel segment signals communicate control information reports transmitted from the communications device. Exemplary control information reports communicated by a dedicated control channel segment include, e.g., uplink traffic channel request reports, interference reports, SNR reports, noise reports, and power availability reports.

In some embodiments, operation proceeds from step 1606 to step 1608. In step 1608, the base station transmits control instructions used to control said communications device using downlink communications resources included in said allocated portion of said communications resources. For example, consider that the allocated resources include both uplink and downlink communications resources. The downlink allocated communications resources include, in one embodiment, power control channel segments, which the base station uses to transmit power control instructions on a recurring basis. For example, a transmitted power control instruction is, in one exemplary embodiment a command to either raise or lower the transmission power level of the wireless terminal by a predetermined amount, step and/or gain adjustment.

The operations of steps 1604, 1606 and/or 1608 may be performed by the base station for each of one or more wireless terminals which are to be operated, e.g., concurrently in an On state of operation. Different assigned mask values, in some embodiments, corresponds to different levels of ON state operation, e.g., ON mask=111 corresponds to a full-tone format mode on On state operation; On mask=001, 010 or 100 correspond to a ⅓ split tone format mode of On state operation; On mask=110, 010, or 011 correspond to a ⅔ split tone format mode of On state operation.

In various embodiments, recurring uplink and/or downlink channel structures are implemented by a base station and known by the base station and wireless terminal. In such an embodiment, step 1604 may be performed for a wireless terminal once, e.g., the base station allocates resources in the recurring channel structure, and then steps 1606 and/or 1608 are repeated on a recurring basis, e.g., until the resource allocation is withdrawn and/or changed by the base station and/or the wireless terminal terminates its connection with the base station. For example, resources may be withdrawn when the wireless terminal is transitioned from an On state to a sleep state or a Hold state. It should be appreciated that this approach of allocation of resources in a recurring structure can significantly reduce overhead control signaling over other approaches.

Figure 17:
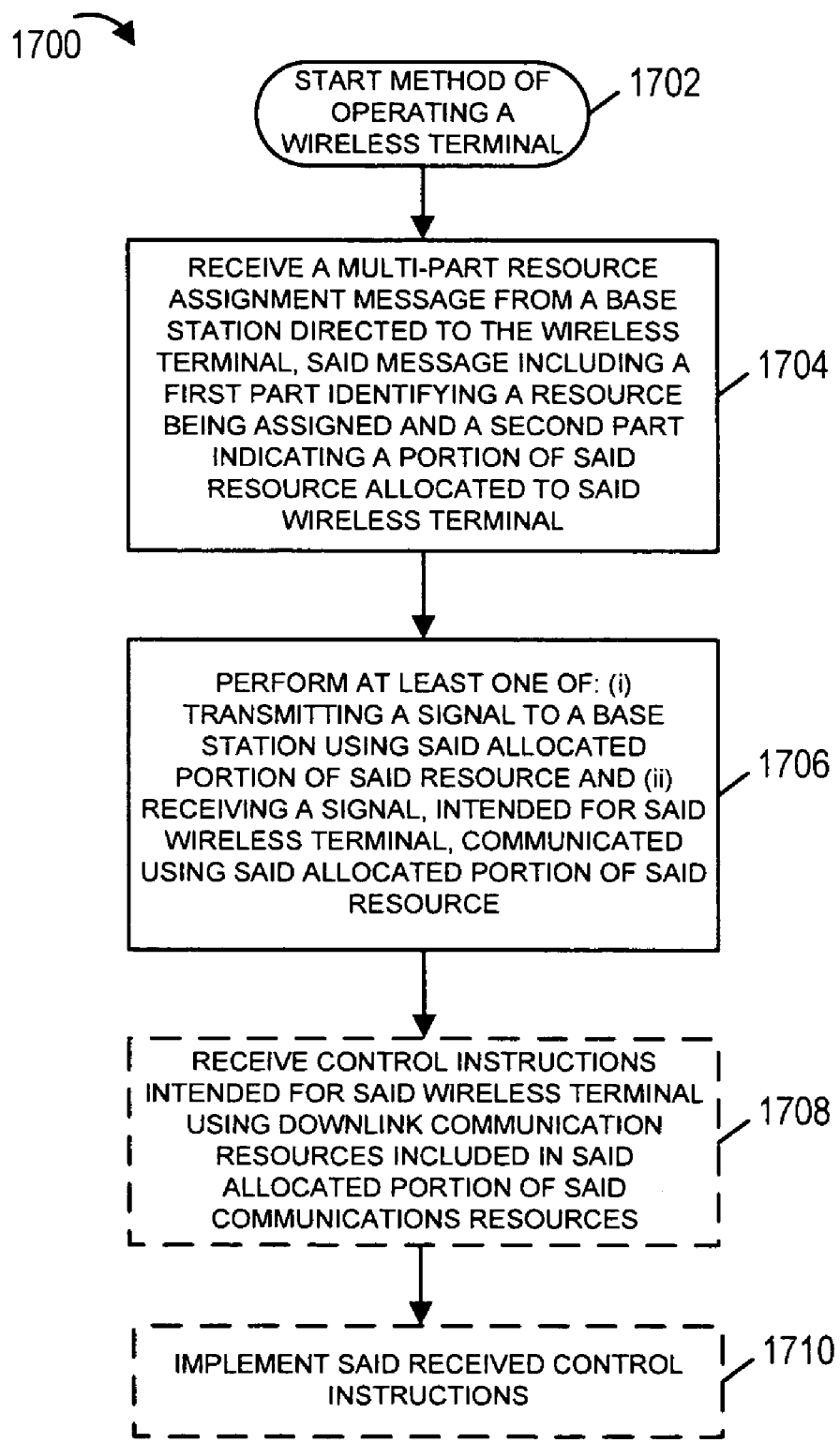
FIG. 17 is a drawing of a flowchart of an exemplary method of operating a wireless terminal in accordance with various embodiments.

FIG. 17 is a drawing of a flowchart 1700 of an exemplary method of operating a wireless terminal in accordance with various embodiments. The exemplary method starts in step 1702, where the wireless terminal is power on and initialized. In step 1702, the wireless terminal may transmit a request to the base station requesting to be transitioned in an ON state of operation, e.g., so that it may be subsequently assigned traffic channel segments. Operation proceeds from step 1702 to step 1704.

In step 1704, the wireless terminal receives a multi-part resource assignment message from a base station directed to the wireless terminal, said message including a first part identifying a resource being assigned and a second part indicating a portion of said resource allocated to said wireless terminal. For example, the multi-part resource assignment message, in some embodiments, is a state transition message indicating a state transition to an On state of operation. In some such embodiments multiple on states of operation are supported, e.g., a full tone format DCCH mode of ON state operation, a ⅓ split tone format DCCH mode of On state operation, and a ⅔ split tone format DCCH mode of On state operation. In some embodiments, the first part conveys a base station assigned wireless terminal ON state identifier, e.g., a 5 bit value in the range 1 . . . 31, each different value associated with a different dedicated control channel uplink logical tone in the channel structure. In some embodiment, the second part conveys a wireless terminal On mask, e.g., a three bit mask, with each bit of the mask associated with portion of the assigned resources. Operation proceeds from step 1704 to step 1706.

In step 1706, the wireless terminal performs at least one of: (i) transmitting a signal to a base station using said allocated resource, e.g., transmitting dedicated control channel signals using allocated dedicated control channel segments and (ii) receiving a signal, intended for said wireless terminal, communicated using said allocated portion of said resource, e.g., receiving wireless terminal power control command signals communicated using a downlink power control channel segment allocated to the wireless terminal.

In some embodiments, operation proceeds from step 1706 to step 1708. In step 1708, the wireless terminal receives control instructions intended for said wireless terminal using downlink communication resources included in said communications resource. Operation proceeds from step 1708 to step 1710. In step 1710, the base station implements said received control instructions. For example, consider that the allocated resource communicated via the state transition message includes both uplink and downlink segments and consider that step 1706 applies to the uplink dedicated control channel segments. Then, step 1708 can thus apply to the downlink power control channel segments, and in step 1710 the wireless terminal can use the information received in step 1708 to adjust its transmission power level of a reference signal which is being closed loop power controlled by the base station to achieve a target received power at the base station. For example, the wireless terminal adjusts the transmission power level of its dedicated control channel segment signals in response to the information of step 1708.

In some embodiments, the assigned resource being assigned by the multi-part resource assignment message includes an uplink communications resource, e.g., a frequency resource. For example, the assigned resource is in an exemplary embodiment, a single tone and the indicated portion indicates a sequence of time periods in which said tone is allocated to the wireless terminal. For example, with reference to FIG. 6, consider that the assigned resource is one of the 31 tones in the set of indexed logical channel uplink tones (81 . . . 111), and the indicated portion is some or all of the segments identified in the row corresponding to the tone.

In various embodiments, the first part of the multi-part resource assignment message includes a first number of bits and the second part of the multi-part resource assignment message includes a second number of bits, and the second part indicates a fractional portion of said resource allocated to said wireless terminal. For example, in one exemplary embodiment the second number of bits is 3.

In some embodiments, the resource includes a set of non-overlapping fractional portions; the second part is a bit mask, and the second number is equal to said non-overlapping fractional portion in said set. In some such embodiments, the value of each bit in the bit mask indicates assignment or non-assignment of one of said non-overlapping fractional portions in said set. For example, with respect to FIG. 6, an exemplary first non-overlapping fractional portion, corresponding to the resource of tone 81 and the least significant bit of the bit mask=1, includes segment[1][0], segment [1][3] and segment [1][6]; an exemplary second non-overlapping fractional portion, corresponding to the resource of tone 81 and the second significant bit of the bit mask=1, includes segment[1][1], segment [1][4] and segment [1][7]; an exemplary third non-overlapping fractional portion, corresponding to the resource of tone 81 and the most significant bit of the bit mask=1, includes segment[1][2], segment [1][5] and segment [1][8].

In some embodiments, when all the bits in the bit mask indicate assignment of the corresponding non-overlapping portions, the wireless terminal is allocated the complete assigned resource. For example, with respect to FIG. 6, consider that the assigned resource identified by the first part of the multi-part resource message has identified tone 81, when the assigned bit mask in the multi-part resource allocation message is equal to 111, the wireless receives the complete set of segments {segment [1][0], segment [1][1], segment [1][2], segment[1][3], segment[1][4], segment[1][5], segment[1][6], segment[1][7], segment[1][8]}.

Figure 20:
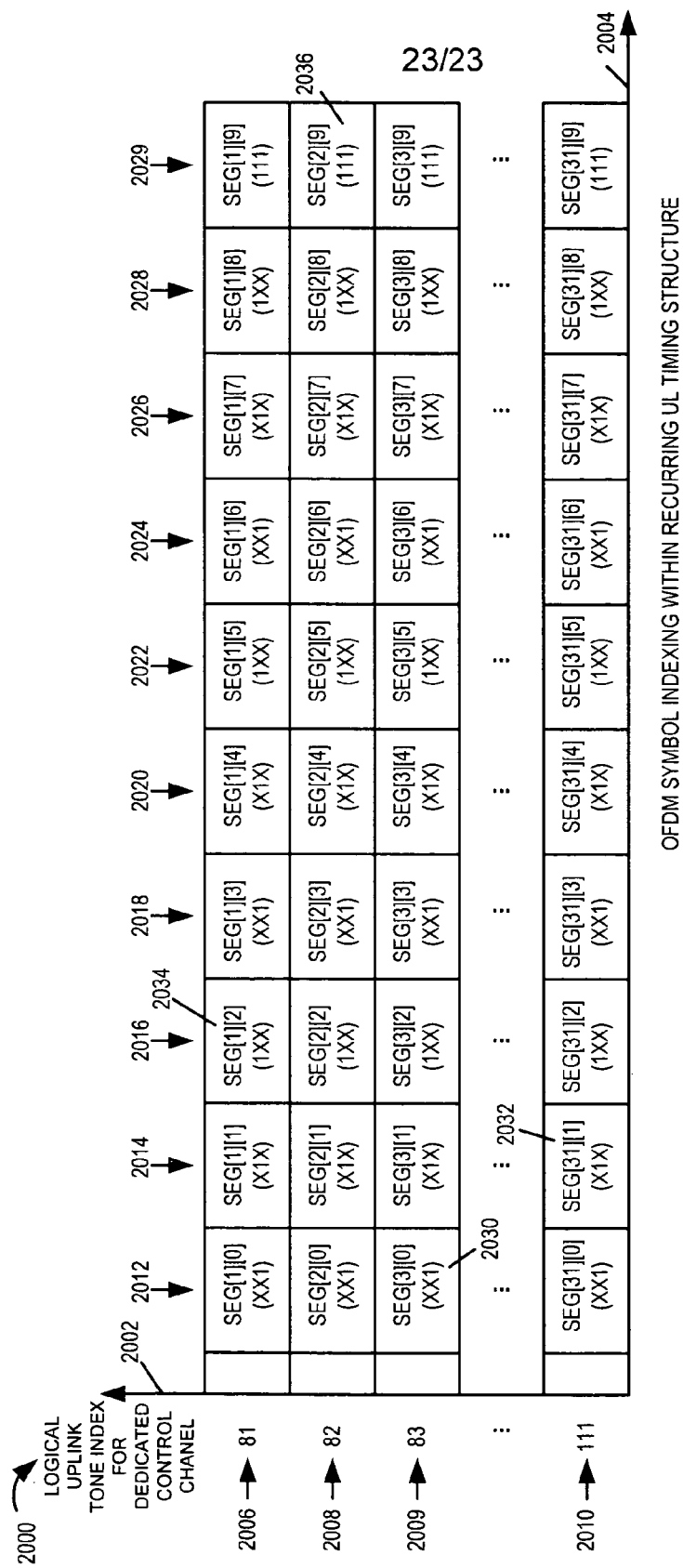
FIG. 20 is a drawing illustrating an exemplary dedicated control channel segments of a recurring structure.

In some such embodiments, the complete assigned resource includes each of the non-overlapping fractional portions in said set and a remainder portion of said allocated resources not included in any of said non-overlapping fractional portions. FIG. 20 illustrates a recurring dedicated control channel structure of an exemplary embodiment including, corresponding to the resource of a single uplink dedicated control channel logical tone, 3 non-overlapping fractional portions, each non-overlapping fractional portion including 3 dedicated control channel segments, and a remainder portion including 1 dedicated control channel segment.

In various embodiments, the non-overlapping fractional portions are of the same size. For example, consider FIG. 6 in which each non-overlapping fractional portion includes 3 segments.

In some embodiments, the allocated resource is dedicated to communicating control information reports transmitted by the wireless terminal. For example, the allocated resource is, in some embodiments, segments in a recurring dedicated control channel structure used to communicate a variety of uplink control information reports, e.g., uplink request reports for uplink traffic channel resources, interference reports such as beacon ratio reports, SNR reports, noise reports, power reports such as wireless terminal transmission power backoff reports, etc.

Figure 18A:
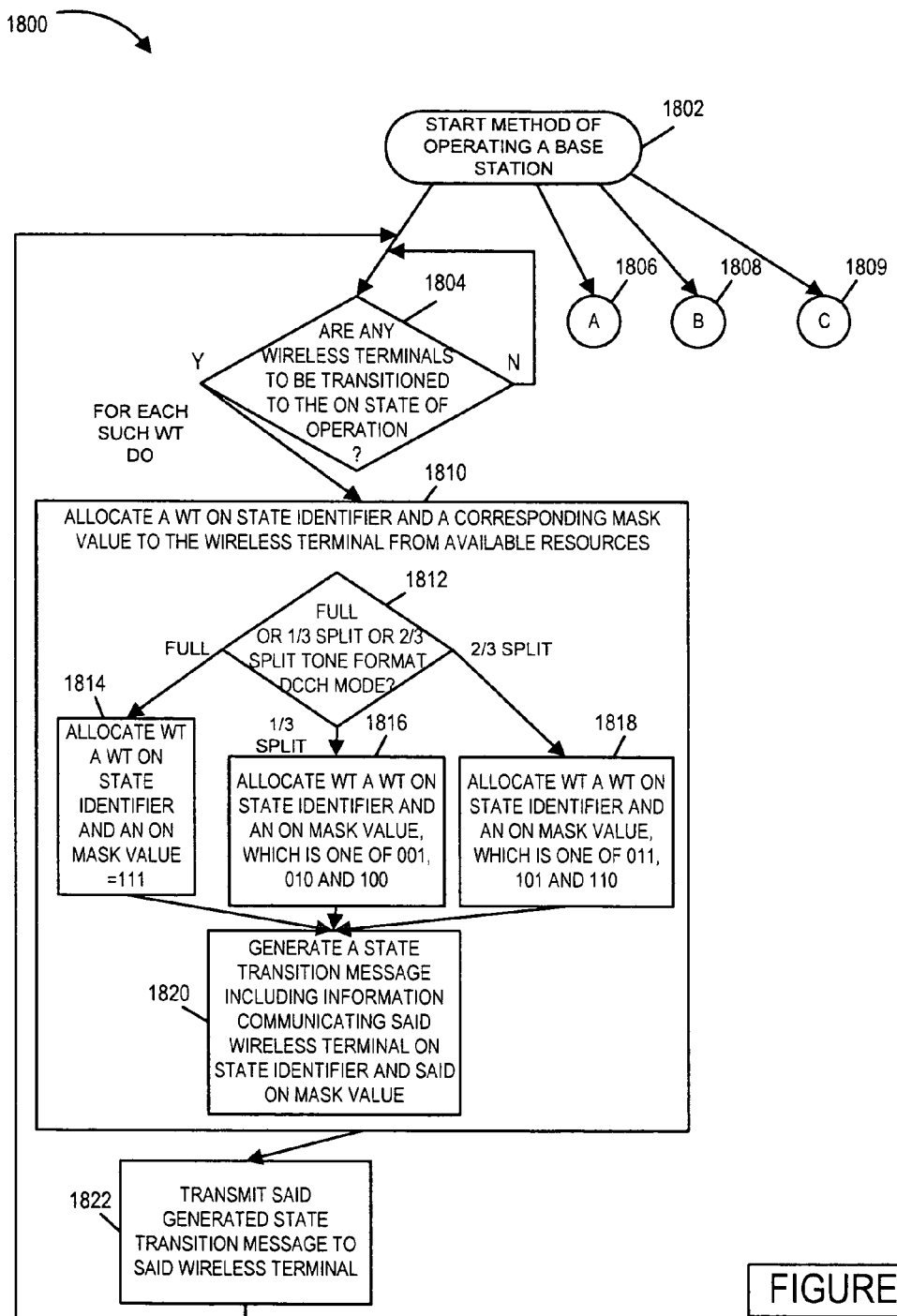
FIG. 18, comprising the combination of FIG. 18A, FIG. 18B
FIG. 18C is a drawing of a flowchart of an exemplary method of operating a base station in accordance with various embodiments.
Figure 18B:
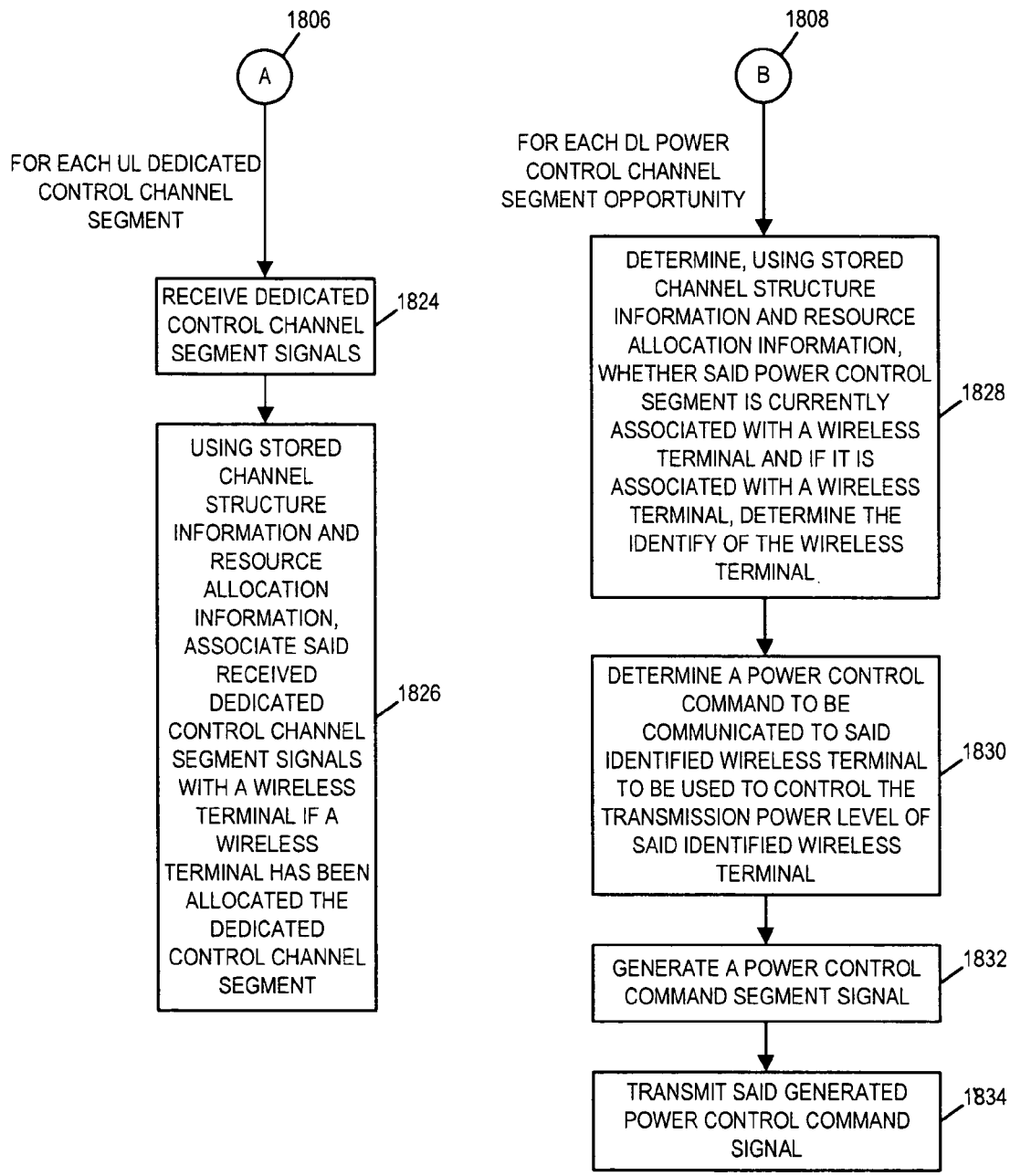
Figure 18C:
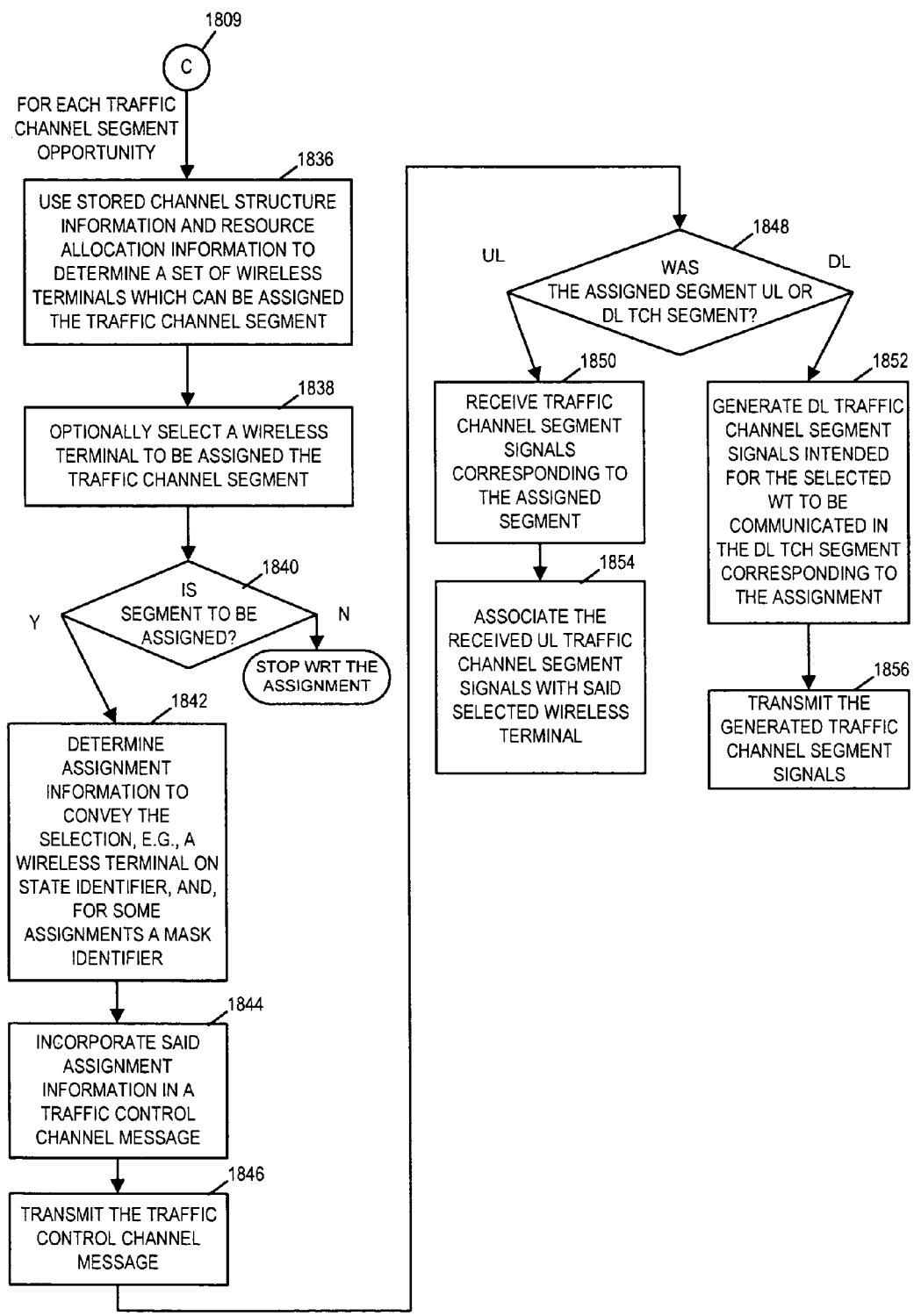

FIG. 18, comprising the combination of FIG. 18A, FIG. 18B and FIG. 18C is a drawing of a flowchart 1800 of an exemplary method of operating a base station in accordance with various embodiments. The exemplary method starts in step 1802, where the base station is powered on and initialized. Operation proceeds from start step 1802 to step 1804. Operation also proceeds from step 1802 to step 1824 via connecting node A 1806 for each uplink dedicated control channel segment. In addition, operation proceeds from step 1802 to step 1828, via connecting node B 1808 for each downlink power control segment opportunity. Operation also proceeds from step 1802 to step 1836 via connecting node C 1809 for each traffic channel segment opportunity.

In step 1804, the base station determines, on a recurring basis, whether there are any wireless terminals to be transitioned into the On state of operation. For each such wireless terminal to be transitioned into the On state of operation, operation proceeds from step 1804 to step 1810. In step 1810, the base station allocates a wireless terminal On state identifier and a corresponding mask value to the wireless terminal from available resources. Step 1810 includes sub-steps 1812, 1814, 1816, 1818 and 1820. In sub-step 1818, the base station determines whether the wireless terminal should be transitioned in a full tone format dedicated control channel On state operation, a ⅓ split tone format mode of dedicated control channel ON state operation, or a ⅔ split tone format mode of dedicated control channel On state operation. If it is determined in step 1812 that the transition is to be in full tone mode operation proceeds from step 1812 to step 1814; if it is determined in step 1812 that the transition is to be in ⅓ split tone mode operation proceeds from step 1812 to step 1816; if it is determined in step 1812 that the transition is to be into ⅔ split tone mode operation proceeds from step 1812 to step 1818.

In sub-step 1814, the base station allocates the wireless terminal a wireless terminal on state identifier and an ON mask value=111. Alternately, in sub-step 1816, the base station assigns a wireless terminal a wireless terminal On state identifier and an On mask value which is one of 001, 010 and 100. Alternately, in sub-step 1818, the base station assigns a wireless terminal a wireless terminal On state identifier and an On state mask value which is one of 011, 110 and 110. Operation proceeds from one of sub-step 1814, 1816 and 1818 to sub-step 1820.

In sub-step 1820, the base station generates a state transition message including information communicating said wireless terminal On state identifier and said On mask value. Operation proceeds from step 1810 to step 1822. In step 1822, the base station transmits the generated state transition message to said wireless terminal.

As previously described, operation proceeds from step 1802 to step 1824, via connecting node A 1806 for each uplink dedicated control channel segment. In step 1824, the base station receives dedicated control channel segment signals. Operation proceeds from step 1824 to step 1826. In step 1826, the base station uses stored channel structure information and resource allocation information, to associate said received dedicated control channel segment signals with a wireless terminal, if a wireless terminal has been allocated the dedicated control channel segment.

As previously described, operation proceeds from step 1802 to step 1808, via connecting node B 1828, for each downlink power control segment opportunity. In step 1828, the base station determines, using stored channel structure information and resource allocation information, whether said power control segment is currently associated with a wireless terminal, and if it is associated with a wireless terminal, the base station determines the identity of the wireless terminal. Operation proceeds from step 1828 to step 1830. In step 1830, the base station determines a power control command to be communicated to said identified wireless terminal to be used to control the transmission power level of said identified wireless terminal. Operation proceeds from step 1830 to step 1832. Instep 1832, the base station generates a power control command segment signal, and then in step 1834, the base station transmits the generated power control command signal.

As previously described, operation proceeds from step 1802 to step 1836, via connecting node C 1809 for each traffic channel segment opportunity. In step 1836, the base station uses stored channel structure information and resource allocation information to determine a set of wireless terminals which can be assigned the traffic channel segment. Operation proceeds from step 1836 to step 1838. In step 1838, the base station optionally selects a wireless terminal to be assigned the traffic channel segment. Operation proceeds from step 1838 to step 1840. In step 1840, the base station determines whether or not the segment is to be assigned. If the segment is to be assigned, operation proceeds from step 1840 to step 1842; otherwise the base station stops with respect to the assignment.

In step 1842, the base station determines assignment information to convey the selection, e.g., a wireless terminal On state identifier and, for some assignments, a mask identifier. The mask identifier, e.g., a single bit value, is in some embodiments used to distinguish between different masks, e.g., XX1 or 1XX, which may be associated with the segment. Operation proceeds from step 1842 to step 1844.

In step 1844, the base station incorporates said assignment information in a traffic control channel message. Operation proceeds from step 1844 to step 1846, in which the base station transmits the traffic control channel message. In an exemplary embodiment, an assignment slot for a corresponding traffic channel segment included a traffic control channel message has a predetermined position in the message and the message has a predetermined position in the recurring channel structure with respect to the corresponding traffic channel segment, thus eliminating the need for information in the assignment message identifying which traffic channel segment is being assigned.

Operation proceeds from step 1846 to step 1848. In step 1848, the base station determines was the assigned segment and uplink or downlink traffic channel segment. If the assigned segment was an uplink traffic channel segment, operation proceeds from step 1848 to step 1850; if the assigned segment was a downlink traffic channel segment operation proceeds from step 1848 to step 1852.

In step 1850, the base station receives traffic channel segment signals corresponding to the assigned segment. Operation proceeds from step 1850 to step 1854. In step 1854, the base station associates the received uplink traffic channel segment signals with said selected wireless terminal.

In step 1852, the base station generates downlink traffic channel segment signals intended for the selected wireless terminal to be communicated in the downlink traffic channel segment corresponding to the assignment. Operation proceeds from step 1852 to step 1856. In step 1856, the base station transmits the generated traffic channel segment signals.

Figure 19A:
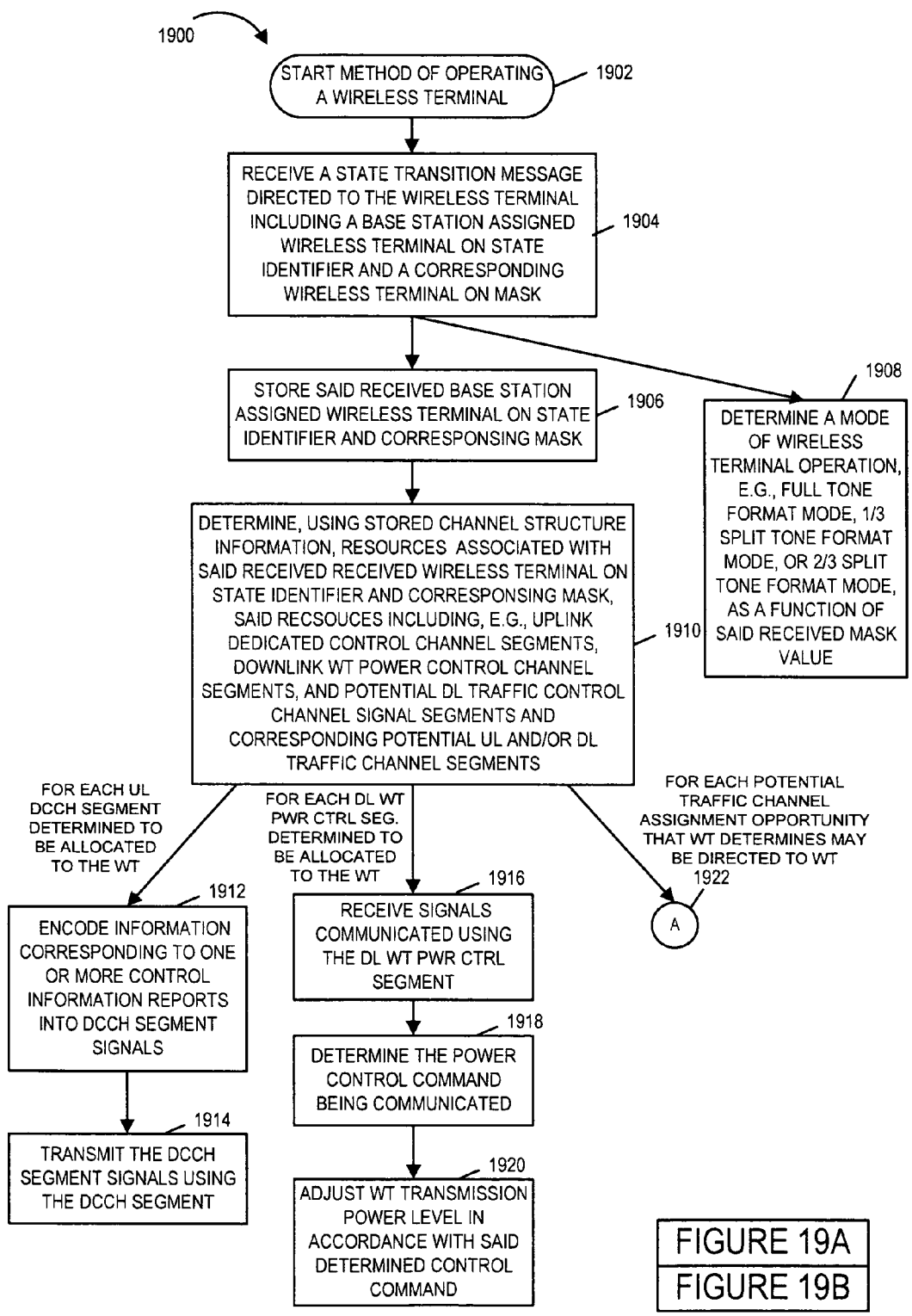
FIG. 19, comprising the combination of FIG. 19A
FIG. 19B is a drawing of an exemplary flowchart in accordance with various exemplary embodiments.
Figure 19B:
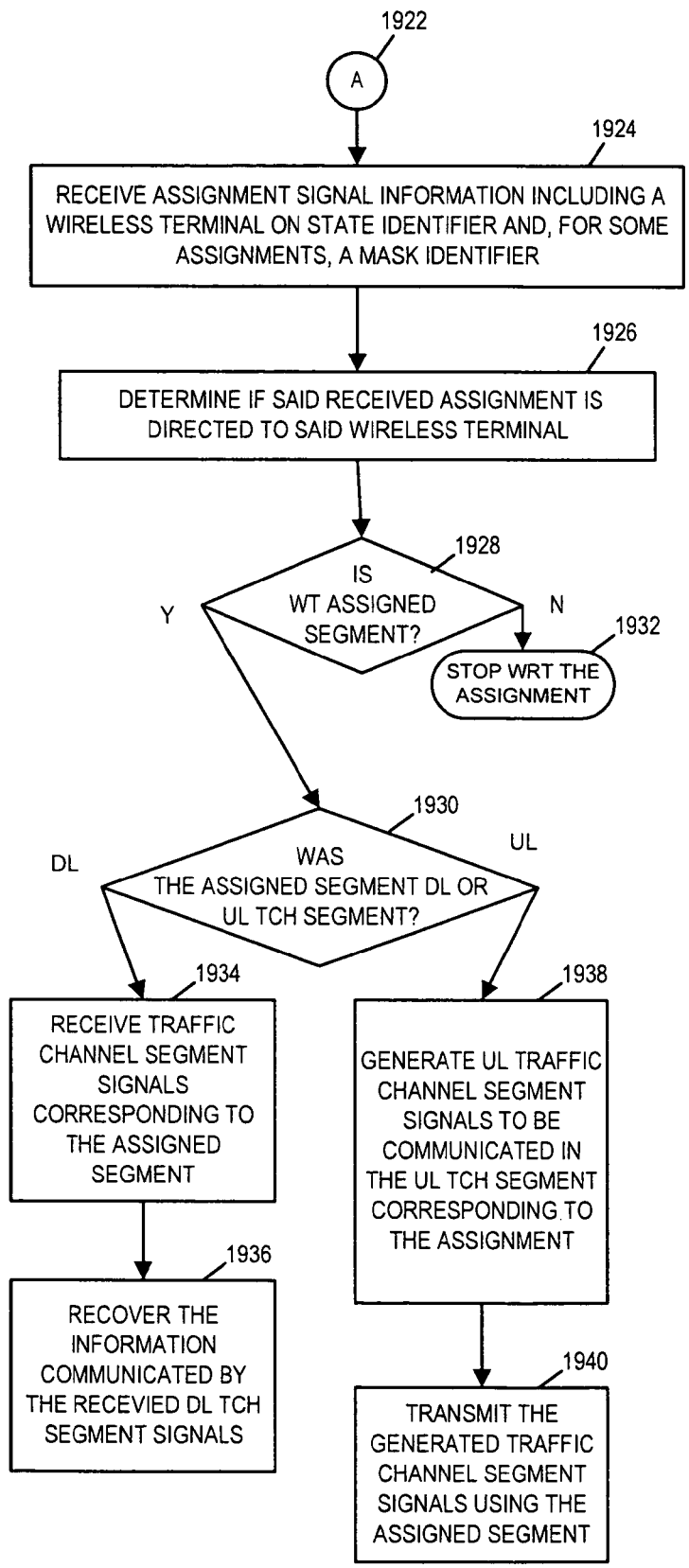

FIG. 19, comprising the combination of FIG. 19A and FIG. 19B is a drawing of an exemplary flowchart 1900 in accordance with various exemplary embodiments. Operation starts in step 1902, where the wireless terminal is power on and initialized. In step 1902, the wireless terminal may request that the base station transition the wireless terminal to an On state of operation, e.g., so that the wireless terminal may be assigned traffic channel segments. Operation proceeds from step 1902 to step 1904.

In step 1904, the wireless terminal receives a state transition message directed to the wireless terminal including a base station assigned wireless terminal On state identifier and a corresponding wireless terminal On mask. Operation proceeds from step 1904 to step 1906 and step 1908. In step 1908, the wireless terminal stores said received base station assigned wireless terminal On state identifier, e.g., a 5 bit value in the range of 1 . . . 31, and corresponding mask, e.g., a 3 bit value being one of 001, 010, 100, 110, 101, 011, and 111. In step 1908, the wireless terminal determines a mode of wireless terminal operation, e.g., a full tone format mode, a ⅓ split tone format mode or a ⅔ split tone format mode as a function of said received mask value. For example, in one exemplary embodiment, bit mask value pattern=111 corresponds to a full tone format mode of On state operation and represents a first level of On state operation representing a high level of resource allocation; bit mask patterns of 110, 101, and 011 correspond to a ⅔ split tone format mode of On state operation representing an intermediate level of resource allocation; and bit mask patterns 001, 010 and 100 correspond to a ⅓ split tone format mode of On state operation representing a low level of resource allocation.

Operation proceeds from step 1906 to step 1910. In step 1910, the wireless terminal determines, using stored channel structure information, resources associated with said received wireless terminal On state identifier and corresponding mask. The resources include, e.g., uplink dedicated control channel segments, downlink wireless terminal power control channel segments, and potential downlink traffic control channel segments and corresponding potential uplink and/or downlink traffic channel segments.

For each uplink dedicated control channel segment determined to be allocated to the wireless terminal, operation proceeds from step 1910 to step 1912. For each downlink wireless terminal power control channel segment determined to be allocated to the wireless terminal operation proceeds from step 1910 to step 1916. For each potential traffic channel assignment opportunity that the wireless terminal determines may be directed to the wireless terminal, operation proceeds from step 1910 via connecting node A 1922 to step 1924.

In step 1912, the wireless terminal encodes information corresponding to one or more control information reports into dedicated control channel segment signals. Operation proceeds from step 1912 to step 1914. In step 1914, the wireless terminal transmits the dedicated control channel segment signals using the dedicated control channel segment.

In step 1916, the wireless terminal receives signals communicated using the downlink wireless terminal power control segment. Operation proceeds from step 1916 to step 1918 in which the wireless terminal determines the power control command being communicated via the received signals of step 1916. Then, in step 1920, the wireless terminal adjusts its transmission power level in accordance with said determined control command.

In step 1924, the wireless terminal receives assignment signal information including a wireless terminal on state identifier and, for some assignments, a mask identifier. Operation proceeds from step 1924 to step 1926. In step 1926, the wireless terminal determines if said received assignment is directed to the wireless terminal, then in step 1928 operation proceeds based on the determination of step 1926. If the wireless terminal is determined to be assigned the segment operation proceeds from step 1928 to step 1930; otherwise operation is directed to step 1932, where the wireless terminal stops operation with respect to the assignment since it is not the intended recipient of the assignment.

In step 1930, the wireless terminal determines whether the assigned segment is a downlink traffic channel segment or an uplink traffic channel segment. If the assigned segment is a downlink traffic channel segment operation proceeds from step 1930 to step 1934; if the assigned segment is an uplink traffic channel segment operation proceeds from step 1930 to step 1938.

In step 1934, the wireless terminal receives traffic channel signals corresponding to the assigned segment. Then in step 1936, the wireless terminal recovers the information communicated by the received downlink traffic channel segment signals.

In step 1938, the wireless terminal generates uplink traffic channel segment signals to be communicated in the uplink traffic channel segment corresponding to the assignment. Then in step 1940, the wireless terminal transmits the generated traffic channel segment signals using the assigned segment.

FIG. 20 is a drawing 2000 illustrating an exemplary dedicated control channel segments of a recurring structure. The exemplary dedicated control channel segments of drawing 2000 may be the dedicated control channel segments 510 of uplink channel structure 501 of FIG. 5. Vertical axis 2002 represents logical uplink tone index for the dedicated control channel while the horizontal axis 2004 represents OFDM symbol indexing within a recurring uplink timing structure. In this example, each dedicated control channel segment uses one logical uplink tone for a plurality of OFDM symbol transmission time periods, e.g., 21 OFDM symbol transmission time periods. In this exemplary embodiment, there are 31 logical channel uplink tones used by the dedicated control channel (tone with index=81 2606 which corresponds to base station assigned wireless terminal On state identifier=00001, tone with index=82 2608 which corresponds to base station assigned wireless terminal ON state identifier=00010, tone with index=83 2609 which corresponds to base station assigned wireless terminal ON state identifier=00011 . . . , tone with index=111 2610 which corresponds to base station assigned wireless terminal ON state identifier=11111. First vertical column 2012 identifies a first set of 31 dedicated control channel indexed segments in the recurring structure, one segment associated with each of the 31 tones being used by the dedicated control channel. Similarly, vertical columns (2014, 2016, 2018, 2020, 2022, 2024, 2026, 2028, 2029) identify additional sets of indexed segments in the recurring channel structure. In this example, each dedicated control channel segment is identified by seg[i][j], where i is an integer in the range 1 . . . 31 and j is an integer in the range 0 . . . 9. The value of i identifies a dedicated control channel tone and base station assigned wireless terminal ON state identifier, the j value identifies a relative time position within the recurring timing structure. Also in FIG. 20 in each box representing a dedicated control channel segment, there is a three bit pattern identifying wireless terminal On state mask bit which corresponds to the segment. In this example, segments of columns 2012, 2018, and 2024 are associated with bit mask pattern XX1; segments of columns 2014, 2020, and 2026 are associated with bit mask pattern X1X; segments of columns 2016, 2022, and 2028 are associated with bit mask pattern 1XX, where X is a don't care condition. Segments of column 2029 are associated with bit mask=111.

For example exemplary dedicated control channel segment [3][0] 2030 corresponds to logical uplink tone 83, base station assigned wireless terminal On state identifier=00011 (3) and corresponds to wt On mask setting XX1, where X represents a don't care condition. Thus a wireless terminal which is assigned base station ON state identifier=00011 and a corresponding mask value equal to any one of: 111, 001, 011, and 101 is the wireless terminal which is currently allocated to use the dedicated control channel segment. Continuing with the example exemplary dedicated control channel segment [31][1] 2032 corresponds to logical uplink tone 111, base station assigned wireless terminal identifier=11111 (31) and corresponds to wt On mask setting X1X. Thus a wireless terminal which is assigned base station ON state identifier=11111 and a mask equal to any one of: 111, 010, 011, and 110 is the wireless terminal which is currently allocated to use the dedicated control channel segment. Continuing with the example exemplary dedicated control channel segment [1][2] 2034 corresponds to logical uplink tone 81, base station assigned wireless terminal identifier=00001 (1) and corresponds to wt On mask setting 1XX. Thus a wireless terminal which is assigned base station ON state identifier=00001 and a mask equal to any one of: 111, 100, 110, and 101 is the wireless terminal which is currently allocated to use the dedicated control channel segment. For each given dedicated control channel segment at most one wireless terminal is allocated the segment in accordance with the predetermined channel structure information, known to both the base station and wireless terminals, and the base station assignment of a wireless terminal identifier and wtOnMask, e.g., in a previously communicated state transition message.

In some embodiments, a wireless terminal allocated each of the dedicated control channel segments corresponding to a dedicated control channel logical channel tone in a recurring structure, e.g., 10 segments, is sometimes described as being commanded into a full tone format dedicated control channel mode of ON state operation; a wireless terminal allocated approximately ⅓ the dedicated control channel segments corresponding to a dedicated control channel logical channel tone in a recurring structure, e.g., 3 out of 10 segments, is sometimes described as being commanded into a ⅓ split tone format dedicated control channel mode of ON state operation; a wireless terminal allocated approximately ⅔ the dedicated control channel segments corresponding to a dedicated control channel logical channel tone in a recurring structure, e.g., 6 out of 10 segments, is sometimes described as being commanded into a ⅔ split tone format dedicated control channel mode of ON state operation.

Numerous variation of channel structure are possible in accordance with various embodiments. For example, in one exemplary embodiment, a recurring uplink channel structure includes 40 indexed dedicated control channel segments corresponding to a dedicated control channel logical uplink tone. In some such embodiments, in full tone format the wireless terminal is allocated all of the 40 segments, in ⅓ split tone format the wireless terminal is allocated one non-overlapping set of 13 segments.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus, are applicable to a wide range of communications systems including many non-OFDM and/or non-cellular systems.

Numerous additional variations on the methods and apparatus described above will be apparent to those skilled in the art in view of the above description. Such variations are to be considered within scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of indicating to a communications device a resource utilization state in which the Communications device is to operate, the method comprising:
    transmitting a multi-part resource assignment message, said message including a first part identifying a resource being assigned and a second part indicating a portion of said resource allocated to said communications device; and
    performing at least one of receiving a signal communicated using said allocated portion of said resource from said communications device and transmitting a signal communicated using said allocated portion of said resource to said communications device,
    stored information associating each of a predetermined set of bit patterns to be communicated in a first part of a multi-part resource assignment message to a different set of downlink control channel segments;
    stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
    a wireless terminal command control module for generating control instructions to transmit to said communications device using said allocated portion of said downlink communications resource.

2. The method of claim 1, wherein said assigned resource includes an uplink communications resource.

3. The method of claim 2, wherein said assigned resource is a frequency resource.

4. The method of claim 2 wherein said assigned resource is a single tone and wherein said indicated portion indicates a sequence of time periods in which said tone is allocated to said communications device.

5. The method of claim 1, wherein said first part includes a first number of bits and said second part includes a second number of bits, said second part indicating a fractional portion of said resource allocated to said communications device.

6. The method of claim 5, wherein said first number is different than said second number and wherein said second number of bits is 3.

7. The method of claim 5,
    wherein said resource includes a set of non-overlapping fractional portions; and
    wherein said second part is a bit mask, said second number being equal to the number of said non-overlapping fractional portions in said set.

8. The method of claim 7, wherein the value of each bit in the bit mask indicates assignment or non-assignment of one of said non-overlapping fraction portions in said set.

9. The method of claim 7, wherein when all of the bits in the bit mask indicate assignment of the corresponding non-overlapping portions, the communications device is allocated the complete assigned resource.

10. The method of claim 9, wherein the complete assigned resource includes each of the non-overlapping fractional portions in said set and a remainder portion of said allocated resource not included in any of said non-overlapping fractional portions.

11. The method of claim 7, wherein the non-overlapping portions are of the same size.

12. The method of claim 7, wherein said allocated resource is dedicated to communicating control information reports transmitted by said communications device.

13. The method of claim 2, wherein said assigned resource further includes a downlink communications resource.

14. The method of claim 13, further comprising:
transmitting control instructions used to control said communications device using said allocated portion of the downlink communications resource.

15. The method of claim 14, wherein said control instructions are power control instructions which are transmitted on a recurring basis.

16. A base station comprising:
a multi-part resource assignment message generation module for generating a multi-part resource assignment message, said multi-part resource assignment message including a first part identifying a resource being assigned and a second part indicating a portion of said resource being allocated to a communication device to which said multi-part resource assignment message is directed; and
a transmitter for transmitting said generated multi-part resource assignment message,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

17. The base station of claim 16, further comprising:
a receiver for receiving a signal communicated using said allocated portion of said resource from said communications device; and
a signal recovery module for recovering control information reports from received signals communicated using said allocated portion of said resource from said communications device.

18. The base station of claim 17, further comprising:
stored information associating each of a predetermined set of bit patterns to be communicated in a first part of a multi-part resource assignment message to a different uplink dedicated control channel tone.

19. The base station of claim 18, wherein a second part of a multi-part resource assignment message is a bit mask, the base station further comprising:
stored information associating each bit of the bit mask with uplink dedicated control channel segments.

20. The base station of claim 18, wherein for a single uplink dedicated control channel tone, each bit of the bit mask is associated with a different predetermined set of dedicated control channel segments, said different predetermined sets of dedicated control channel segments being non-overlapping.

21. The method of claim 17, wherein said assigned resource includes both an uplink and downlink communications resource.

22. The base station of claim 21, wherein, said wireless terminal command control module is a wireless terminal transmission power control module.

23. The base station of claim 17, wherein the pattern of the second part of said multi-part resource assignment message indicates one of a plurality of different levels of On state operation in which traffic channel segments may be assigned to a wireless terminal.

24. The base station of claim 23, wherein when the second part indicates a first level of On state operation a larger number of traffic channel segments are available for potential assignment to said communications device than if the second part indicates another level of On state operation.

25. A base station comprising:
means for generating a multi-part resource assignment Message, said multi-part resource assignment message including a first part identifying a resource being assigned and a second part indicating a portion of said resource being allocated to a communication device to which said multi-part resource assignment message is directed; and
means for transmitting said generated multi-part resource assignment message,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
means for generating control instructions for generating control instructions to be transmitted to said communications device using said allocated portion of said downlink communications resource.

26. The base station of claim 25, further comprising:
means for receiving a signal communicated using said allocated portion of said resource from said communications device; and
a signal recovery module for recovering control information reports from received signals communicated using said allocated portion of said resource from said communications device.

27. The base station of claim 26, further comprising:
stored information associating each of a predetermined set of bit patterns to be communicated in a first part of a multi-part resource assignment message to a different uplink dedicated control channel tone.

28. The base station of claim 27, wherein a second part of a multi-part resource assignment message is a bit mask, the base station further comprising:
stored information associating each bit of the bit mask with uplink dedicated control channel segments.

29. The base station of claim 27, wherein for a single uplink dedicated control channel tone, each bit of the bit mask is associated with a different predetermined set of dedicated control channel segments, said different predetermined sets of dedicated control channel segments being non-overlapping.

30. The method of claim 26, wherein said assigned resource includes both an uplink and downlink communications resource.

31. The base station of claim 30, wherein said means for generating control instructions includes means for generating wireless terminal transmission power level control commands.

32. The base station of claim 26, wherein the pattern of the second part of said multi-part resource assignment message indicates one of a plurality of different levels of On state operation in which traffic channel segments may be assigned to a wireless terminal.

33. The base station of claim 32, wherein when the second part indicates a first level of On state operation a larger number of traffic channel segments are available for potential assignment to said communications device than if the second part indicates another level of On state operation.

34. A computer readable medium embodying machine executable instructions for controlling a base station to implement a method, the method comprising:
transmitting a multi-part resource assignment message, said message including a first part identifying a resource being assigned and a second part indicating a portion of said resource allocated to said communications device; and
performing at least one of receiving a signal communicated using said allocated portion of said resource from said communications device and transmitting a signal communicated using said allocated portion of said resource to said communications device,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

35. The computer readable medium of claim 34, wherein said assigned resource includes an uplink communications resource.

36. The computer readable medium of claim 35, wherein said assigned resource is a frequency resource.

37. The computer readable medium of claim 35 wherein said assigned resource is a single tone and wherein said indicated portion indicates a sequence of time periods in which said tone is allocated to said communications device.

38. The computer readable medium of claim 34, wherein said first part includes a first number of bits and said second part includes a second number of bits, said second part indicating a fractional portion of said resource allocated to said communications device.

39. An apparatus operable in a communications system, the apparatus comprising:
a processor configured to control a communications device to:
transmit a multi-part resource assignment message, said message including a first part identifying a resource being assigned and a second part indicating a portion of said resource allocated to said communications device; and
perform at least one of receive a signal communicated using said allocated portion of said resource from said communications device and transmit a signal communicated using said allocated portion of said resource to said communications device,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

40. The apparatus of claim 39, wherein said assigned resource includes an uplink communications resource.

41. The apparatus of claim 40, wherein said assigned resource is a frequency resource.

42. A method of operating a wireless terminal to determine a resource utilization state in which the communications device is to operate, the method comprising:
receiving a multi-part resource assignment message, said message including a first part identifying a resource being assigned and a second part indicating a portion of said resource allocated to said wireless terminal; and
performing at least one of transmitting a signal using said allocated portion of said resource and receiving a signal communicated using said allocated portion of said resource,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

43. The method of claim 42, wherein said assigned resource includes an uplink communications resource.

44. The method of claim 43, wherein said assigned resource is a frequency resource.

45. The method of claim 43, wherein said assigned resource is a single tone and wherein said indicated portion indicates a sequence of time periods in which said tone is allocated to said wireless terminal.

46. The method of claim 42, wherein said first part includes a first number of bits and said second part includes a second number of bits, said second part indicating a fractional portion of said resource allocated to said wireless terminal, stored information associating each of a predetermined set of bit patterns to be communicated in a first part of a multi-part resource assignment message to a different set of downlink control channel segments;

stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and a wireless terminal command control module for generating control instructions to transmit to said communications device using said allocated portion of said downlink communications resource.

47. The method of claim 46, wherein said second number of bits is 3.

48. The method of claim 46,
wherein said resource includes a set of non-overlapping fractional portions; and
wherein said second part is a bit mask, said second number being equal to the number of said non-overlapping fractional portions in said set.

49. The method of claim 48, wherein the value of each bit in the bit mask indicates assignment or non-assignment of one of said non-overlapping fraction portions in said set.

50. The method of claim 48, wherein when all of the bits in the bit mask indicate assignment of the corresponding non-overlapping portions, the wireless terminal is allocated the complete assigned resource.

51. The method of claim 50, wherein the complete assigned resource includes each of the non-overlapping fractional portions in said set and a remainder portion of said allocated resource not included in any of said non-overlapping fractional portions.

52. The method of claim 48, wherein the non-overlapping portions are of the same size.

53. The method of claim 48, wherein said allocated resource is dedicated to communicating control information reports transmitted by said wireless terminal.

54. The method of claim 43, wherein said assigned resource further includes a downlink communications resource.

55. The method of claim 54, further comprising:
receiving control instructions used to control said wireless terminal using said allocated portion of the downlink communications resource.

56. The method of claim 55, wherein said control instructions are power control instructions which are transmitted on a recurring basis.

57. A wireless terminal comprising:
a receiver for receiving a multi-part resource assignment message, said message including a first part identifying a resource being assigned and a second part indicating a portion of said resource allocated to said wireless terminal;
a resource allocation determination module for determining said assigned resource and said allocated portion of said assigned resource as a function Of information communicated in said multi-part resource assignment message,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

58. The wireless terminal of claim 57, wherein said allocated portion of said resource includes an allocated uplink communications resource, the wireless terminal further comprising:
a transmitter for transmitting a signal using said allocated portion of said resource.

59. The wireless terminal of claim 58, wherein said allocated uplink communications resources includes a plurality of dedicated control channel segments.

60. The wireless terminal of claim 59, wherein said allocated portion of said resource includes an allocated downlink communications resource, the wireless terminal, further comprising:
a wireless terminal transmission power control module processing received power control commands directed to said wireless terminal communicated via said allocated downlink communications resource.

61. The wireless terminal of claim 57, wherein the second part is a bit mask.

62. The wireless terminal of claim 58, wherein when the bit mask is equal to a first predetermined pattern, the wireless terminal is allocated the completed assigned resource.

63. The wireless terminal of claim 62, wherein the value of each bit of the bit mask signifies allocation or lack thereof of allocation of a non-overlapping portion of the assigned resource.

64. The wireless terminal of claim 63, further comprising:
stored information associating each of a set of predetermined bit pattern possible for the first part of the multi-part assignment message with a different dedicated control channel uplink tone.

65. The wireless terminal of claim 64, further comprising:
stored information associating, for each different dedicated control channel uplink tone, a corresponding set of non-overlapping dedicated control channel segments.

66. The wireless terminal of claim 63, further comprising:
stored information associating:
a single predetermined bit pattern from a plurality of possible predetermined bit patterns for said mask with a first commanded mode of wireless terminal On state operation;
a first plurality of predetermined bit patterns from said plurality of possible predetermined bit patterns for said mask with a second commanded mode of wireless terminal On state operation, wherein said wireless terminal is a candidate for assignment of traffic channel segments in both modes of ON state operation, and wherein said wireless terminal is a precluded from being assigned a higher number of traffic channel segments in said second commanded mode of ON state operation than in said first mode of On state operation.

67. A wireless terminal comprising:
means for receiving a multi-part resource assignment message, said message including a first part identifying a resource being assigned and a second part indicating a portion of said resource allocated to said wireless terminal;

means for determining said assigned resource and said allocated portion of said assigned resource as a function of information communicated in said multi-part resource assignment message, stored information associating each of a predetermined set of bit patterns to be communicated in a first part of a multi-part resource assignment message to a different set of downlink control channel segments;

stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and a wireless terminal command control module for generating control instructions to transmit to said communications device using said allocated portion of said downlink communications resource.

68. The wireless terminal of claim 67, wherein said allocated portion of said resource includes an allocated uplink communications resource, the wireless terminal further comprising:

means for transmitting a signal using said allocated portion of said resource.

69. The wireless terminal of claim 68, wherein said allocated uplink communications resources includes a plurality of dedicated control channel segments.

70. The wireless terminal of claim 69, wherein said allocated portion of said resource includes an allocated downlink communications resource, the wireless terminal further comprising:

means for processing received power control commands directed to said wireless terminal communicated via said allocated downlink communications resource.

71. The wireless terminal of claim 67, wherein the second part is a bit mask.

72. The wireless terminal of claim 68, wherein when the bit mask is equal to a first predetermined pattern, the wireless terminal is allocated the completed assigned resource.

73. The wireless terminal of claim 72, wherein the value of each bit of the bit mask signifies allocation or lack thereof of allocation of a non-overlapping portion of the assigned resource.

74. The wireless terminal of claim 73, further comprising:
stored information associating each of a set of predetermined bit pattern possible for the first part of the multi-part assignment message with a different dedicated control channel uplink tone.

75. The wireless terminal of claim 74, further comprising:
stored information associating, for each different dedicated control channel uplink tone, a corresponding set of non-overlapping dedicated control channel segments.

76. The wireless terminal of claim 73, further comprising:
stored information associating:
a single predetermined bit pattern from a plurality of possible predetermined bit patterns for said mask with a first commanded mode of wireless terminal On state operation;
a first plurality of predetermined bit patterns from said plurality of possible predetermined bit patterns for said mask with a second commanded mode of wireless terminal On state operation, wherein said wireless terminal is a candidate for assignment of traffic channel segments in both modes of ON state operation, and wherein said wireless terminal is a precluded from being assigned a higher number of traffic channel segments in said second commanded mode of ON state operation than in said first mode of On state operation.

77. A computer readable medium embodying machine executable instructions for controlling a wireless terminal to implement a method, the method comprising:
receiving a multi-part resource assignment message, said message including a first part identifying a resource being assigned and a second part indicating a portion of said resource allocated to said wireless terminal; and
performing at least one of transmitting a signal using said allocated portion of said resource and receiving a signal communicated using said allocated portion of said resource,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

78. The computer readable medium of claim 77, wherein said assigned resource includes an uplink communications resource.

79. The computer readable medium of claim 78, wherein said assigned resource is a frequency resource.

80. The computer readable medium of claim 78, wherein said assigned resource is a single tone and wherein said indicated portion indicates a sequence of time periods in which said tone is allocated to said wireless terminal.

81. The computer readable medium of claim 77, wherein said first part includes a first number of bits and said second part includes a second number of bits, said second part indicating a fractional portion of said resource allocated to said wireless terminal.

82. An apparatus operable in a communication system, the apparatus comprising: a processor configured to control a communications device to:
receive a multi-part resource assignment message, said message including a first part identifying a resource being assigned and a second part indicating a portion of said resource allocated to said wireless terminal; and
perform at least one of transmitting a signal using said allocated portion of said resource and receiving a signal communicated using said allocated portion of said resource,
stored information associating each of a predetermined set of bit patterns to be communicated in a first part of a multi-part resource assignment message to a different set of downlink control channel segments;
stored information associating, for each of a predetermined set of bit patterns to be communicated in a first part of a multi-part resource assignment message, each bit of a bit mask communicated in a second part of a multi-part resource assignment message with a subset of the set of downlink control channel segments associated with the first part; and
a wireless terminal command control module for generating control instructions to transmit to said communications device using said allocated portion of said downlink communications resource.

83. The apparatus of claim 82, wherein said assigned resource includes an uplink communications resource.

84. The apparatus of claim 83, wherein said assigned resource is a frequency resource.

* * * * *